US012665308B2

(12) United States Patent
Panther et al.

(10) Patent No.: US 12,665,308 B2
(45) Date of Patent: Jun. 23, 2026

(54) BROADBAND LOW PROFILE ANTENNA DEVICES AND METHODS

(71) Applicant: CALIAN GNSS LTD., Ottawa (CA)

(72) Inventors: Gyles Panther, Ottawa (CA); Julien Hautcoeur, Gatineau (CA); Joseph Botros, Ottawa (CA); Reza Movahedinia, Stittsville (CA)

(73) Assignee: Calian GNSS Ltd., Ottawa (CA)

( * ) Notice: Subject to any disclaimer, the term of this patent is extended or adjusted under 35 U.S.C. 154(b) by 34 days.

(21) Appl. No.: 18/709,277

(22) PCT Filed: Nov. 14, 2022

(86) PCT No.: PCT/CA2022/051674

§ 371 (c)(1),
(2) Date: May 10, 2024

(87) PCT Pub. No.: WO2023/087099

PCT Pub. Date: May 25, 2023

(65) Prior Publication Data

US 2025/0007169 A1 Jan. 2, 2025

Related U.S. Application Data

(60) Provisional application No. 63/370,775, filed on Aug. 8, 2022, provisional application No. 63/279,798, filed on Nov. 16, 2021.

(51) Int. Cl.
*H01Q 9/16* (2006.01)
*G01S 19/36* (2010.01)
(Continued)

(52) U.S. Cl.
CPC .......... *H01Q 9/0428* (2013.01); *G01S 19/36* (2013.01); *H01Q 1/48* (2013.01); *H01Q 9/16* (2013.01)

(58) Field of Classification Search
CPC .......... H01Q 1/48; H01Q 5/328; H01Q 5/357; H01Q 5/49; H01Q 21/24; H01Q 9/0428;
(Continued)

(56) References Cited

U.S. PATENT DOCUMENTS

2011/0279339 A1* 11/2011 Johnston ................ H01Q 13/02
343/786
2017/0256854 A1* 9/2017 Hu ........................... H01Q 9/40
(Continued)

FOREIGN PATENT DOCUMENTS

WO 2004049505 A1 6/2004
WO WO-2021046635 A1 * 3/2021 ............. H01Q 9/285
WO 2022268086 A1 12/2022

*Primary Examiner* — Thai Pham

(74) *Attorney, Agent, or Firm* — Rosenberg, Klein & Lee

(57) ABSTRACT

Competing tradeoffs of overall footprint, weight, and performance impact the design of antennas for many applications. However, those for compact portable devices or mobile platforms exploiting global navigation satellite systems these are further compounded by seeking good performance over a wide angular range. Accordingly, it would be beneficial to provide designers of a wide range of electrical devices and systems with compact broadband antennas which offer a low vertical profile relative to that provided by the common filar element approaches for high precision applications. Accordingly, through a combination of a dipole, a parasitic element, and additional ground elements to a convention ground plane the inventors provide broadband high performance antenna designs with low profile and low overall footprint.

27 Claims, 19 Drawing Sheets

(51) Int. Cl.
  *H01Q 1/48*        (2006.01)
  *H01Q 9/04*        (2006.01)
(58) Field of Classification Search
  CPC ............ H01Q 9/16; H01Q 9/20; H01Q 9/285;
                                    H01Q 25/001
  See application file for complete search history.

(56)                References Cited

U.S. PATENT DOCUMENTS

2018/0040955  A1*    2/2018  Vouvakis ............... H01Q 9/065
2022/0344823  A1*   10/2022  Panther ................. H01Q 21/26

* cited by examiner

1700

BROADBAND LOW PROFILE ANTENNA DEVICES AND METHODS

CROSS-REFERENCE TO RELATED APPLICATIONS

This patent claims the benefit of priority as a 371 National Phase entry application of PCT/CA2022/051674 filed Nov. 14, 2022; which itself claims the benefit of priority to U.S. Provisional Patent Application 63/370,775 filed Aug. 8, 2022 and also claims the benefit of priority to U.S. Provisional Patent Application 63/279,798 filed Nov. 16, 2021.

FIELD OF THE INVENTION

This patent application relates to antennas and more particularly to compact broadband global navigation satellite system antennas, antenna elements and antenna assemblies employing coupled dipole resonator elements.

BACKGROUND OF THE INVENTION

As the applications for such GNSS receivers have expanded with low cost GNSS receiver electronics then there is a constant drive for more compact multiband antennas that can be easily integrated into a wide range of portable devices or more generally into mobile platforms and equipment. In addition to being compact these antennas should provide a controlled radiation pattern, namely a uniform coverage of the upper hemisphere of their radiation pattern and circular polarization purity to improve cross-polarization rejection and hence multipath rejection. Further, low profile, low weight and smaller footprint are of particular importance for many applications.

Accordingly, it would be beneficial to provide antenna elements that support these requirements whilst enabling operation across multiple GNSS systems to provide a single GNSS antenna for multiple GNSS systems to allow a single piece-part to support multiple systems designed for specific GNSS systems or a single system to access multiple GNSS system signals to increase resiliency and redundancy in critical applications.

Other aspects and features of the present invention will become apparent to those ordinarily skilled in the art upon review of the following description of specific embodiments of the invention in conjunction with the accompanying figures.

SUMMARY OF THE INVENTION

It is an object of the present invention to mitigate limitations within the prior art relating to antennas and more particularly to compact broadband global navigation satellite system antennas, antenna elements and antenna assemblies employing coupled dipole resonator elements.

In accordance with an embodiment of the invention there is provided an antenna comprising:
a ground plane;
a dipole comprising a first element and a second element;
a feed point coupled to a first end of the first element and a first end of the second element;
a parasitic element disposed parallel to the dipole having a first end disposed towards a second distal end of the first element and a second distal end disposed towards a second distal end of the second element;

a first ground element coupled at a first end to the ground plane disposed proximate the second distal end of the first element and the first end of the parasitic element;
a second ground element coupled at a first end to the ground plane disposed proximate the second distal end of the second element and the second of the parasitic element.

In accordance with an embodiment of the invention there is provided magnetic dipole responsive to a first linear magnetic field comprising:
a ground plane;
a dipole comprising a first element and a second element;
a feed point coupled to a first end of the first element and a first end of the second element;
a parasitic element disposed parallel to the dipole having a first end disposed towards a second distal end of the first element and a second distal end disposed towards a second distal end of the second element;
a first ground element coupled at a first end to the ground plane disposed proximate the second distal end of the first element and the first end of the parasitic element;
a second ground element coupled at a first end to the ground plane disposed proximate the second distal end of the second element and the second of the parasitic element.

In accordance with an embodiment of the invention there is provided an electric dipole responsive to a linear electric field comprising:
a ground plane;
a dipole comprising a first element and a second element;
a feed point coupled to a first end of the first element and a first end of the second element;
a parasitic element disposed parallel to the dipole having a first end disposed towards a second distal end of the first element and a second distal end disposed towards a second distal end of the second element;
a first ground element coupled at a first end to the ground plane disposed proximate the second distal end of the first element and the first end of the parasitic element;
a second ground element coupled at a first end to the ground plane disposed proximate the second distal end of the second element and the second of the parasitic element.

In accordance with an embodiment of the invention there is provided an antenna responsive to circularly polarized signals comprising:
a ground plane;
a first antenna element disposed upon a first side of the ground plane; and
a second antenna element disposed upon the first side of the ground plane orthogonal to the first antenna element; wherein
the antenna is responsive at any positive elevation above the first side of the ground plane; and
each of the first antenna element and the second antenna element comprise:
a dipole comprising a first element and a second element;
a feed point coupled to a first end of the first element and a first end of the second element;
a parasitic element disposed parallel to the dipole having a first end disposed towards a second distal end of the first element and a second distal end disposed towards a second distal end of the second element;

a first ground element coupled at a first end to the ground plane disposed proximate the second distal end of the first element and the first end of the parasitic element;

a second ground element coupled at a first end to the ground plane disposed proximate the second distal end of the second element and the second of the parasitic element.

In accordance with an embodiment of the invention there is provided an antenna comprising:

a ground plane;

a dipole comprising a first element and a second element;

a feed point coupled to a first end of the first element and a first end of the second element;

an annular parasitic element disposed parallel to the dipole electrically coupled to the dipole, a first ground element and a second ground element;

the first ground element being coupled at a first end to the ground plane disposed proximate the second distal end of the first element and an outer periphery of the annular parasitic element;

the second ground element being coupled at a first end to the ground plane disposed proximate the second distal end of the second element and the outer periphery of the annular parasitic element; wherein a center of the annular parasitic element is aligned with a centre of the dipole.

In accordance with an embodiment of the invention there is provided an antenna comprising:

a ground plane;

a dipole comprising a first element and a second element;

a feed point coupled to a first end of the first element and a first end of the second element;

a first ground element coupled at a first end to the ground plane disposed proximate the second distal end of the first element and extending over a predetermined portion of the first element; and a second ground element coupled at a first end to the ground plane disposed proximate the second distal end of the second element and extending over a predetermined portion of the second element.

In accordance with an embodiment of the invention there is provided an antenna comprising:

a ground plane;

a first antenna element disposed upon a first side of the ground plane; and a second antenna element disposed upon the first side of the ground plane orthogonal to the first antenna element; wherein the antenna is responsive at any positive elevation above the first side of the ground plane; and each of the first antenna element and the second antenna element comprise:

a ground plane;

a dipole comprising a first element and a second element;

a feed point coupled to a first end of the first element and a first end of the second element;

a first ground element coupled at a first end to the ground plane disposed proximate the second distal end of the first element and extending over a predetermined portion of the first element; and a second ground element coupled at a first end to the ground plane disposed proximate the second distal end of the second element and extending over a predetermined portion of the second element.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

Embodiments of the present invention will now be described, by way of example only, with reference to the attached Figures, wherein.

DETAILED DESCRIPTION

Figure 1:
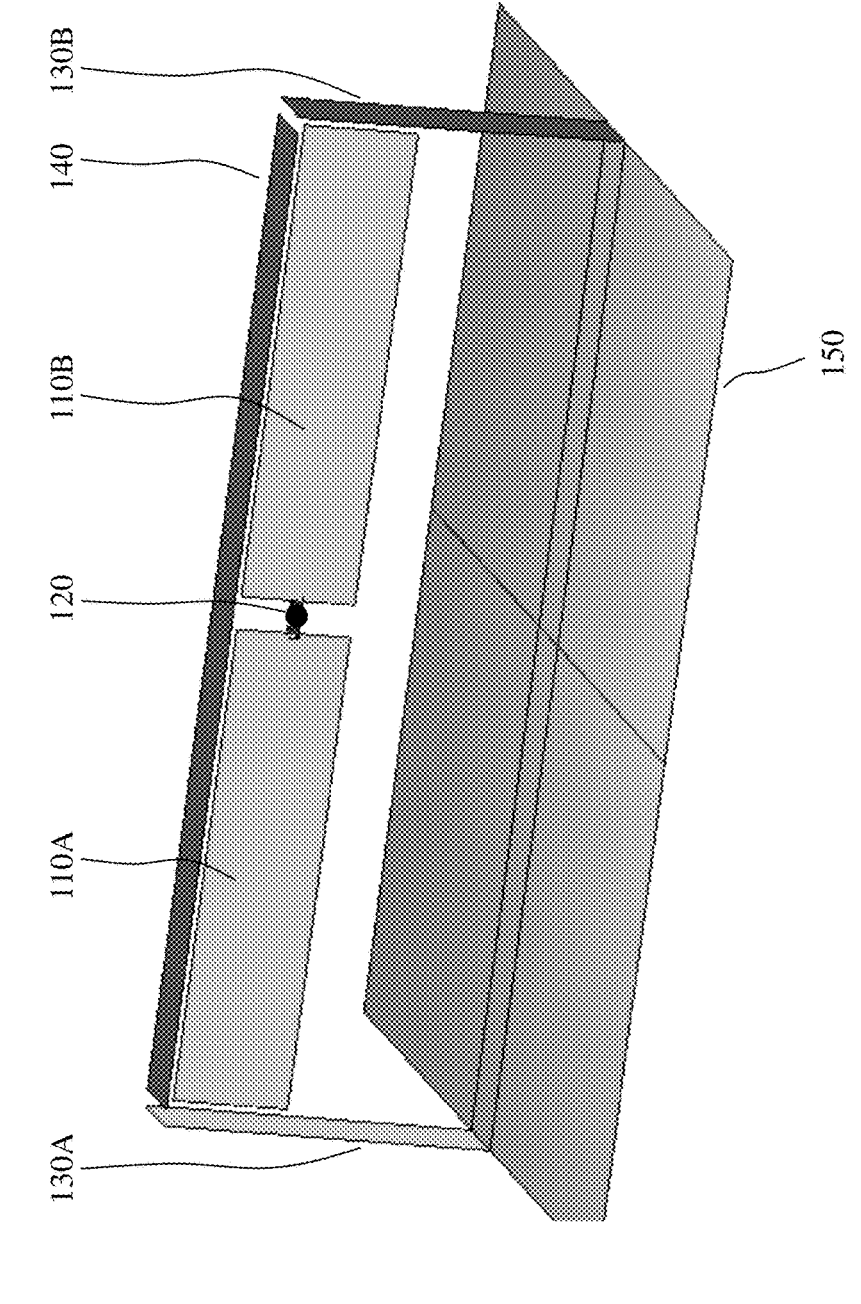
FIG. 1 depicts an exemplary schematic of an inventive broadband antenna according to an embodiment of the invention.

The present description is directed to antennas and more particularly to compact broadband global navigation satellite system antennas, antenna elements and antenna assemblies employing coupled dipole resonator elements.

The ensuing description provides representative embodiment(s) only, and is not intended to limit the scope, applicability or configuration of the disclosure. Rather, the ensuing description of the embodiment(s) will provide those skilled in the art with an enabling description for implementing an embodiment or embodiments of the invention. It being understood that various changes can be made in the function and arrangement of elements without departing from the spirit and scope as set forth in the appended claims. Accordingly, an embodiment is an example or implementation of the inventions and not the sole implementation. Various appearances of "one embodiment," "an embodiment" or "some embodiments" do not necessarily all refer to the same embodiments. Although various features of the invention may be described in the context of a single embodiment, the features may also be provided separately or in any suitable combination. Conversely, although the invention may be described herein in the context of separate embodiments for clarity, the invention can also be implemented in a single embodiment or any combination of embodiments. Further, the terms and phrases used herein are not intended to be limiting, but rather, to provide an understandable description of the invention.

Reference in the specification to "one embodiment," "an embodiment," "some embodiments" or "other embodiments" means that a particular feature, structure, or characteristic described in connection with the embodiments is included in at least one embodiment, but not necessarily all embodiments, of the inventions. The phraseology and terminology employed herein is not to be construed as limiting but is for descriptive purpose only. It is to be understood that where the claims or specification refer to "a" or "an" element, such reference is not to be construed as there being only one of that element. It is to be understood that where the specification states that a component feature, structure, or characteristic "may," "might," "can" or "could" be included, that particular component, feature, structure, or characteristic is not required to be included.

Reference to terms such as "left," "right," "top," "bottom," "front" and "back" are intended for use in respect to the orientation of the particular feature, structure, or element within the figures depicting embodiments of the invention.

It would be evident that such directional terminology with respect to the actual use of a device has no specific meaning as the device can be employed in a multiplicity of orientations by the user or users.

Reference to terms "including," "comprising," "consisting" and grammatical variants thereof do not preclude the addition of one or more components, features, steps, integers or groups thereof and that the terms are not to be construed as specifying components, features, steps or integers. Likewise, the phrase "consisting essentially of," and grammatical variants thereof, when used herein is not to be construed as excluding additional components, steps, features integers or groups thereof but rather that the additional features, integers, steps, components or groups thereof do not materially alter the basic and novel characteristics of the claimed composition, device or method. If the specification or claims refer to "an additional" element, that does not preclude there being more than one of the additional element.

A "feed point" (FP) as used herein and throughout this disclosure relates to or refers to a point at which a microwave track such as those depicted in FIGS. 2-4 and FIGS. 6-8 is coupled to a microwave circuit such as microwave feed network or microwave combining network.

It would be understood by one of skill in the art that the antennas and antenna elements described with respect to embodiments of the invention below may be formed, for example, as discrete metallic elements, as metallic elements upon a formed or shaped circuit board, as metallic elements upon a substrate, as metallic elements upon a flexible circuit board, or as metallic elements formed upon a flexible substrate without departing from the scope of the invention. Alternatively, the antennas and antenna elements described with respect to embodiments of the invention below may be formed as a single piece part using one or more additive manufacturing methodologies as known in the art.

It would be understood by one of skill in the art that that the antennas and antenna elements described with respect to embodiments of the invention below may be employed in antennas of varying three-dimensional geometries including, but not limited to, cylindrical, pyramidal, hemispherical, spherical, and fructo-conical without departing from the scope of the invention.

Table 1 below presents the operating frequencies for single and dual-band GNSS receivers for civilian and military applications. These being Beidou, Galileo, GLONASS, GPS, and NAVIC. Those for Beidou, Galileo, GLONASS and GPS with provide for dual-band operation in the frequency range 1150 MHz-1610 MHz. Accordingly, a GNSS antenna supporting both bands is required to support a larger 140 MHz bandwidth in the lower band, between approximately 1.160 GHz to 1.300 GHz, than the approximately 51 MHz at the upper band, between approximately 1.559 GHz and 1.610 GHz. However, as noted above prior art dual band GNSS antenna structures typically provide wider bandwidth operation at the upper band relative to the lower band. Accordingly, the inventors have established GNSS antenna designs that provide improved bandwidth performance in the lower band enabling operational compatibility with multiple GNSS systems.

Also depicted within Table 1 are the operating frequencies of satellite phone systems which could extend the bandwidth requirements if a dual use antenna was employed.

TABLE 1

| Operating Frequencies of GNSS and Satellite Phone Systems (Nearest 1 MHz) | | |
|---|---|---|
| System | | |
| Beidou | Galileo | GLONASS |
| | Owner | |
| China | Europe | Russia |

| | Beidou | Galileo | GLONASS |
|---|---|---|---|
| Freq. | 1.559-1.563 GHz (B1) | 1.164-1.189 GHz (E5a) | 1.593-1.610 GHz (G1) |
| | 1.195-1.210 GHz (B2) | 1.189-1.214 GHz (E5b) | 1.237-1.254 GHz (G2) |
| | 1.256-1.280 GHz (B3) | 1.260-1.300 GHz (E6) | 1.189-1.214 GHz (G3) |
| | | 1.559-1.591 GHz (E1) | |

| System | |
|---|---|
| GPS | NAVIC |
| Owner | |
| USA | India |

| | GPS | NAVIC |
|---|---|---|
| Freq. | 1.563-1.587 GHz (L1 signal) | 1.164-1.188 GHz (L5 Band) |
| | 1.215-1.2396 GHz (L2 signal) | 2.483-2.500 GHz (S Band) |
| | 1.164-1.189 GHz (L5 Band) | |

| System | | |
|---|---|---|
| Iridium | Inmarsat | Thuraya |
| | Owner | |
| US | UK | United Arab Emirates |

| | Iridium | Inmarsat | Thuraya |
|---|---|---|---|
| Freq. | 1.616-1.627 GHz | 1. 525-1.647 GHz | 1.525-1.661 GHz |

For circularly polarized signals, as employed by GNSS satellites, a pair of antenna elements orthogonally disposed are typically employed where, for a receiver, the wireless signals from the four electrical connections to these two antenna elements are combined within a microwave circuit. Where the four elements are disposed equidistantly then their relative phases may be viewed as 0°, 90°, 180° and 270° respectively. Within the following description single inventive antenna elements are depicted although it would be readily evident to one of skill in the art that these may be employed as the antenna element of a pair of antenna elements to form an antenna for circularly polarized signals.

Referring to FIG. 1 there is depicted an exemplary schematic of an inventive Broadband Antenna 100 according to an embodiment of the invention. Accordingly, a dipole comprising first and second Elements 110A and 110B is depicted disposed above and on an axis parallel to a Ground Plane (GP) 150. The first and second Elements 110A and 110B being orthogonal to the plane of the GP 150 and coupled to a Feed Point (FP) 120. Disposed at an end of the first Element 110A distal to the FP 120 is a first Ground Element 130A which is coupled to the GP 150 and separated from the end of the first Element 110A by a first gap. Disposed at an end of the second Element 110B distal to the FP 120 is a second Ground Element 130B which is coupled to the GP 150 and separated from the end of the second Element 110B by a second gap. The first gap and second gap commonly being equal. Disposed parallel to the first and second Elements 110A and 110B respectively is a Parasitic Element (PE) 140 where the PE 140 is disposed adjacent to the first and second Elements 110A and 110B respectively further from the GP 150. A first end of the PE 140 is separated from the first Ground Element 130A by a third gap. A second distal end of the PE 140 is separated from the second Ground Element 130B by a fourth gap. The third gap and the fourth gap commonly being equal.

As will become evident from the following description, simulations etc. inventive antenna elements according to embodiments of the invention provide wider bandwidth and improved gain and axial ratio at low elevations compared with other antenna forms of similar size and format such as patch antenna elements, for example.

For the purposes of explanation it is useful to describe and consider the geometry of the various embodiments of the inventive antenna described herein with reference to FIGS. 1 to 10, and FIGS. 15-19 respectively. Each embodiment may be viewed as comprising an Antenna Loop (AL) which includes the GP 150, the PE 140 which is distal from and substantially parallel to said GP 150, the PE 140 being coupled at each distal end of said PE 140 to the GP 150 with a pair of Ground Elements (GE), first Ground Element 130A and second Ground 130B respectively, where the PE 140 is further coupled to a Dipole, comprising first Element 110A and second Element 110B. The Dipole further coupled to a balanced Feed Point (FP), FP 120, which are effective in combination to transmit and receive linearly polarized signals over a wide frequency range. Each embodiment is further described in terms of an abstracted Antenna Plane (AP), orthogonal to the GP and disposed at the mid-line of the long axis of the said PE, the mid-point of said PE being defined as the Antenna Center (AC).

An inventive Circularly Polarized Antenna (CP) is realized with two such inventive linearly polarized antenna elements such as depicted in FIGS. 1 to 10, and FIGS. 15-19 respectively, with a common GP 150, with a first AL and a second AL each orthogonal to the other and both orthogonal to the GP 150, with a common AC, and a summing means for summing the electric signals generated at each of the two FPs in phase quadrature for a receiver.

For consideration and computation, a plane, Circularly Polarized (CP) wave can be decomposed as two linearly polarized waves with common Poynting vectors, in phase quadrature, with the rotational direction (right or left) of the vector sum of the superimposed waves determined by the sign of the quadrature phase difference. Further, for any circularly polarized plane wave, the decomposition axis for the E-M fields of the linearly polarized waves is arbitrary; any choice is equally valid. Further, all azimuthal angles relative to the GP 150 are equivalent so that extrapolation and generalization of effects derived by consideration of incident waves "square to" the AP is valid.

The basis for the improved gain and axial ratio at low elevations can be appreciated by one of skill in the art by separately considering plane linearly polarized waves incident at various Poynting vectors and configurations of field axes on an inventive linearly polarized antenna according to an embodiment of the invention or an inventive circularly polarized antenna comprised of two orthogonal linear polarized antennas according to another embodiment of the invention.

In a first case, consider a plane linearly polarized wave incident on an inventive antenna according to an embodiment of the invention with its Poynting vector parallel to both the GP 150 and the PE 140, the incident wave being further characterized as having its associated E-field orthogonal to the GP 150. The associated H-field would thus be parallel to the GP 150 and orthogonal to the AP, so that the AL would contain the incident plane linearly polarized wave magnetic flux and an emf would be generated as a result of the induced loop current which would be coupled to the antenna FP 120. The E field of the incident plane linearly polarized wave being orthogonal to the PE 140 would not thus contribute to the received signal.

In a second case, consider a plane linearly polarized wave incident on an inventive antenna according to an embodiment of the invention with its Poynting vector parallel to the GP 150 and orthogonal to the PE 140, the incident wave being further characterized as having its associated E-field parallel to the PE 140. An emf would thus be induced in the PE and coupled to the antenna FP. As the associated H-Field of the incident plane linearly polarized wave is parallel to the AP, no current would be induced in the AL by the H-Field, which thus would not contribute to any received signal.

In a third case, consider a plane linearly polarized wave incident on an inventive antenna according to an embodiment of the invention such that the Poynting vector is orthogonal to both the GP 150 and the PE 140, the incident wave further characterized as having an E-field orthogonal to the AP. Consequently, no constructive emf would be induced in the PE 140, and because the incident wave H-field would be parallel to the AP no current would be induced in the AL, so that no signal power would be coupled to the antenna FP.

In a fourth case, consider a plane linearly polarized wave incident on an inventive antenna according to an embodiment of the invention such that the Poynting vector is orthogonal to the GP 150 and orthogonal to the PE 140, with the incident wave further characterized as having an E-field parallel to the PE 140. An emf would thus be induced in the PE and coupled to the antenna FP. In addition, the AL would contain the associated magnetic flux and also generate an emf that would be coupled to the antenna FP, so that both of the associated E and H fields contribute to the received signal.

A CP antenna, such as might be utilized to receive signals from a satellite, can be realized using two linearly polarized antennas orthogonally disposed with respect to each other and the GP 150, each linearly polarized antenna being according to an embodiment of the inventive antenna previously described, with the PEs of the respective antennas, linear, planar or three dimensional elements, disposed above (and parallel to) the GP 150.

In a fifth case, a CP wave incident on a CP antenna, with a Poynting vector at zenith (directly overhead in typical use) orthogonal to the GP 150 and, for convenience, the E-field axis of a first component wave of the CP wave further considered as parallel to the PE 140 of a first one of the antenna elements, the first linearly polarized component wave component of the CP wave would be incident on the first antenna according the fourth case described above, so that both the E and H fields of both components each contribute to the signal generated at the first FP. Similarly, the second linear component wave of the CP wave would be incident on the second, orthogonal antenna according to the fourth case described above sot that the received signal at the second FP of the second antenna element would include contributions by both the E-field and H-field of the second component of the CP wave.

In a sixth case, of a CP wave incident on a CP antenna, with a Poynting vector parallel to the GP 150 (on the horizon in typical use) and parallel to the PE 140 of a first linearly polarized antenna, and with the E-field axis of a first component wave of the CP wave considered orthogonal to the GP 150, only the H-Field would contribute the received signal at the first FP and by similar argument, the received signal at the second FP would be only be contributed by the E-Field of the second component of the CP wave. Thus with appropriate dimensions, the magnetic and electric responses may be made equal for CP waves incident at the horizon, which is effective to reduce the axial ratio of the CPO antenna at the horizon.

It will be appreciated that the third case considered above shows that each axis of a circularly polarized antenna realized with two linearly polarized orthogonal antenna elements according to embodiments of the invention is electrically isolated from the other, a necessary condition for reception of CP signals.

Figure 2:
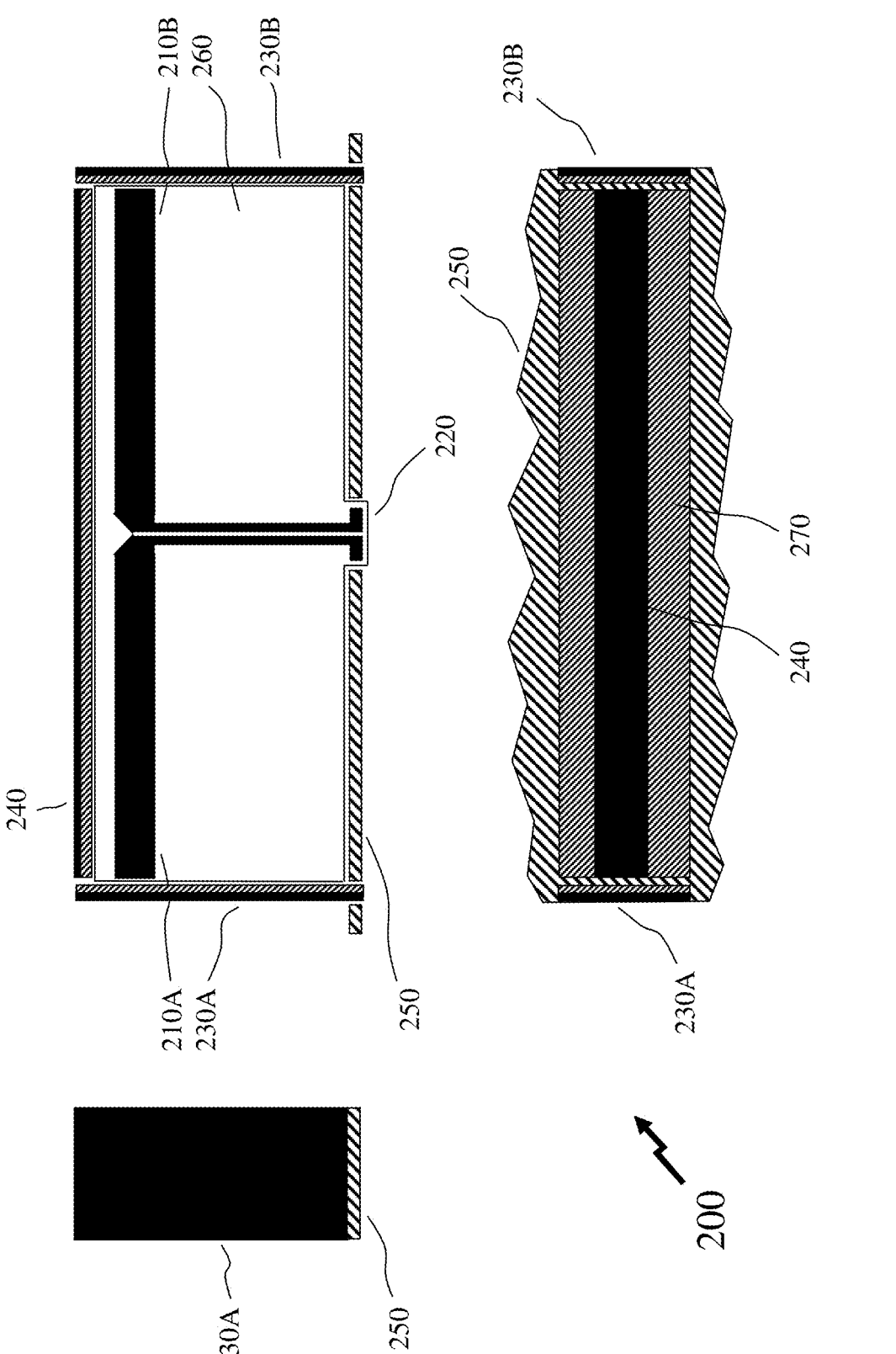
FIG. 2 depicts exemplary cross-section, end elevation and plan view schematics of an inventive broadband antenna according to an embodiment of the invention.

Now referring to FIG. 2 there are depicted an exemplary cross-section, end elevation and plan view schematics of an inventive Broadband Antenna 200 according to an embodiment of the invention operating according to the principles described above with respect to FIG. 1.

Accordingly, there are depicted the first and second Elements 210A and 210B of the dipole upon a Carrier 260 with tracks to the Feed Point (FP) 220 through an opening in the Ground Plane (GP) 250. The first and second Elements 210A and 210B being orthogonal to and parallel to the plane of the GP 250 and coupled to the FP 220. Disposed at an end of the first Element 210A distal to the FP 220 is a first Ground Element 230A which is coupled to the Ground Plane 250 and separated from the end of the first Element 210A by a first gap. Disposed at an end of the second Element 210B distal to the FP 220 is a second Ground Element 230B which is coupled to the GP 250 and separated from the end of the second Element 210B by a second gap. The first gap and second gap commonly being equal.

Also depicted is a Parasitic Element (PE) 240 where a first end of the PE 240 is separated from the first Ground Element 230A by a third gap. A second distal end of the PE 240 is separated from the second Ground Element 230B by a fourth gap. The third gap and the fourth gap commonly being equal. As evident in the end elevation the first Ground Element 230A is a conductive surface. The PE 240 metallization as evident from the plan view is upon a Carrier 270.

Figure 3:
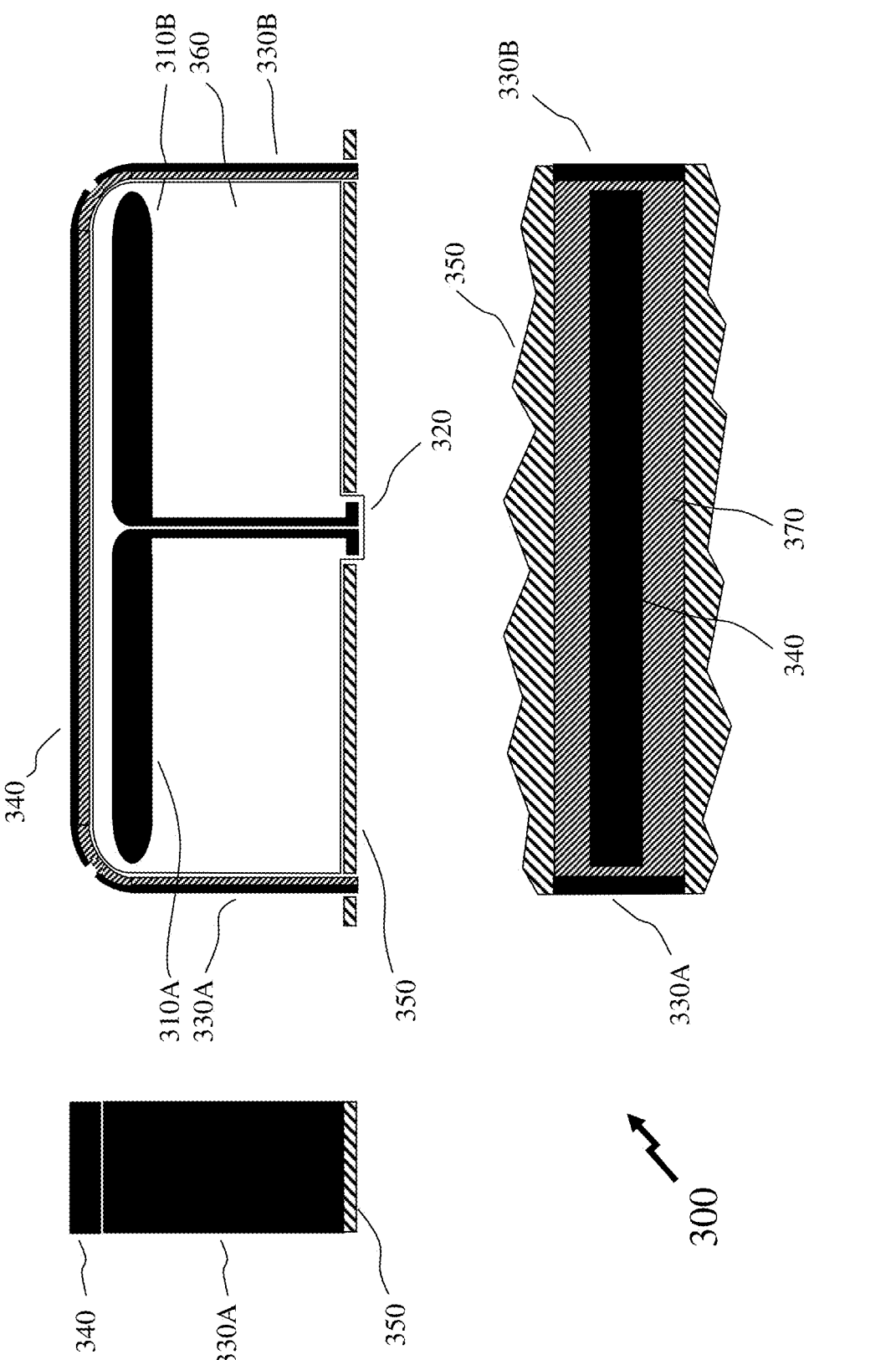
FIG. 3 depicts exemplary cross-section, end elevation and plan view schematics of an inventive broadband antenna according to an embodiment of the invention.

Referring to FIG. 3 there is depicted an exemplary cross-section, end elevation and plan view schematics of an inventive Broadband Antenna 300 according to an embodiment of the invention operating according to the principles described above with respect to FIG. 1.

Accordingly, there are depicted the first and second Elements 310A and 310B of the dipole upon a Carrier 360 with tracks to the Feed Point (FP) 320 through an opening in the Ground Plane (GP) 350. The first and second Elements 310A and 310B being orthogonal to and parallel to the plane of the GP 350 and coupled to the FP 320. Disposed at an end of the first Element 310A distal to its connection to the FP 320 is a first Ground Element 330A which is coupled to the Ground Plane 350 and separated from the end of the first Element 310A by a first gap. Disposed at an end of the second Element 310B distal to the end connecting to the FP 320 is a second Ground Element 330B which is coupled to the GP 350 and separated from the end of the second Element 310B by a second gap. The first gap and second gap commonly being equal.

Also depicted is a Parasitic Element (PE) 340 where a first end of the PE 340 is separated from the first Ground Element 330A by a third gap. A second distal end of the PE 340 is separated from the second Ground Element 330B by a fourth gap. The third gap and the fourth gap commonly being equal. As depicted the first Ground Element 330A, PE 340 and second Ground Element 330B are now all disposed upon a common carrier 370 which is shaped to provide a curved profile.

Figure 4:
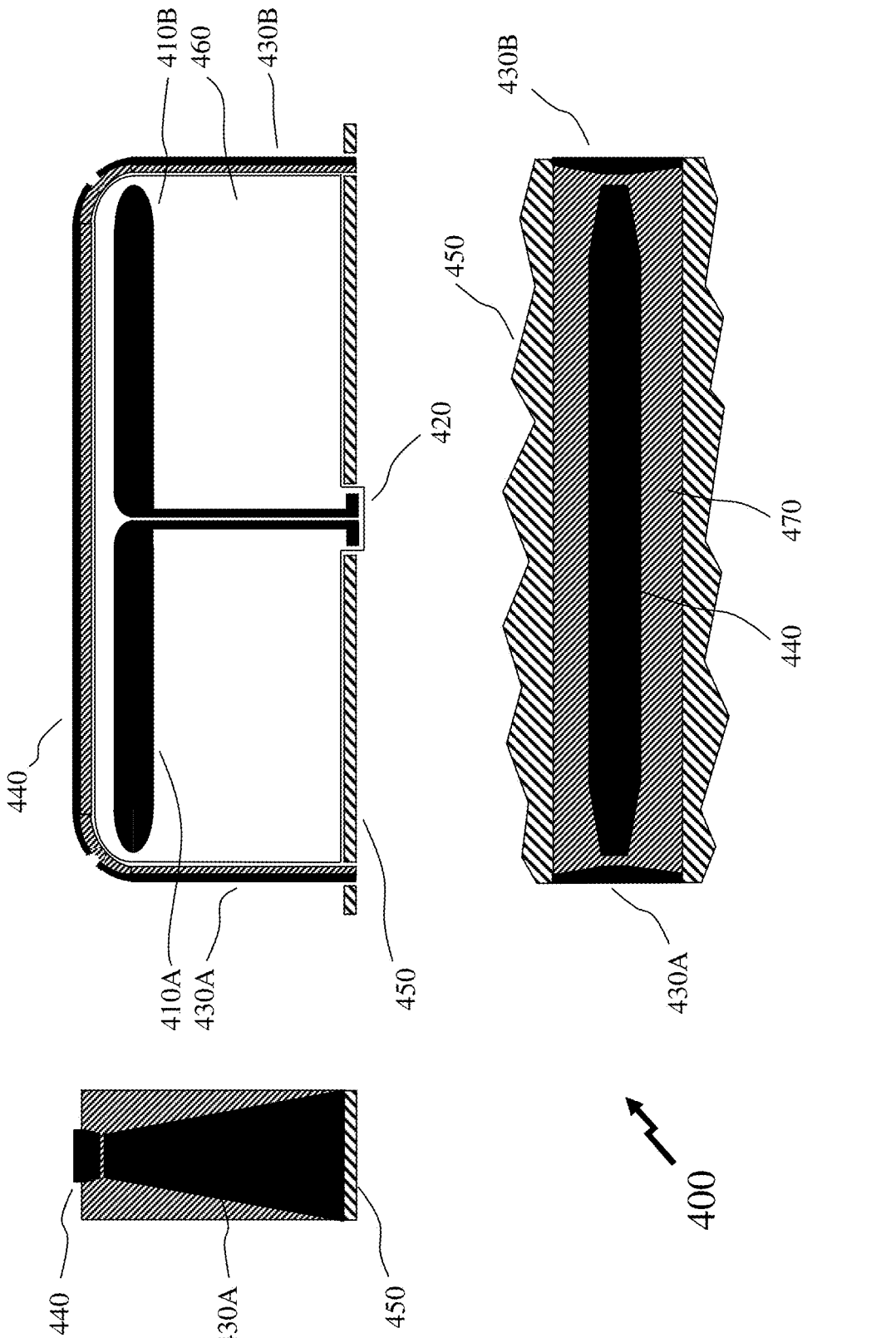
FIG. 4 depicts exemplary cross-section, end elevation and plan view schematics of an inventive broadband antenna according to an embodiment of the invention.

Now referring to FIG. 4 there is depicted an exemplary cross-section, end elevation and plan view schematics of an inventive Broadband Antenna 400 according to an embodiment of the invention operating according to the principles described above with respect to FIG. 1.

Accordingly, there are depicted the first and second Elements 410A and 410B of the dipole upon a Carrier 460 with tracks to the Feed Point (FP) 420 through an opening in the Ground Plane (GP) 450. The first and second Elements 410A and 410B being orthogonal to and parallel to the plane of the GP 450 and coupled to the FP 420. Disposed at an end of the first Element 410A distal to the FP 420 is a first Ground Element 430A which is coupled to the Ground Plane 450 and separated from the end of the first Element 410A by a first gap. Disposed at an end of the second Element 410B distal to the FP 420 is a second Ground Element 430B which is coupled to the GP 450 and separated from the end of the second Element 410B by a second gap. The first gap and second gap commonly being equal. As depicted the first and second Ground Elements 430A and 430B go through openings within the GP 450 and are electrically coupled to the GP 450 (these connections not depicted for clarity)

Also depicted is a Parasitic Element (PE) 440 where a first end of the PE 440 is separated from the first Ground Element 430A by a third gap. A second distal end of the PE 440 is separated from the second Ground Element 430B by a fourth gap. The third gap and the fourth gap commonly being equal. As depicted the first Ground Element 430A, PE 440 and second Ground Element 430B are now all disposed upon a common carrier 470 which is shaped to provide a curved profile. In contrast to Broadband Antennae 200 and 300 the PE 440 and first and second Ground Elements 430A and 430B are now more complex in geometry, i.e. tapering to a common width at the point between them. Within other embodiments of the invention the width of the first and second Ground Elements 430A and 430B closest to the respective ends of the PE 440 may be different to the width of the PE 440 at this point between them. Within other embodiments of the invention the geometry of the first and second Ground Elements 430A and 430B and/or the PE 440 may be more complex than the simple linear tapers shown.

Within FIGS. 2 to 4 the ground elements are depicted as going through openings within the ground plane. The ground elements within other embodiments of the invention may not go through openings within the ground plan and may, for example, be electrically coupled to the ground plane through direct electrical connections, through electrical coupling via one or more electrical components, or electromagnetically coupled.

Figure 5:
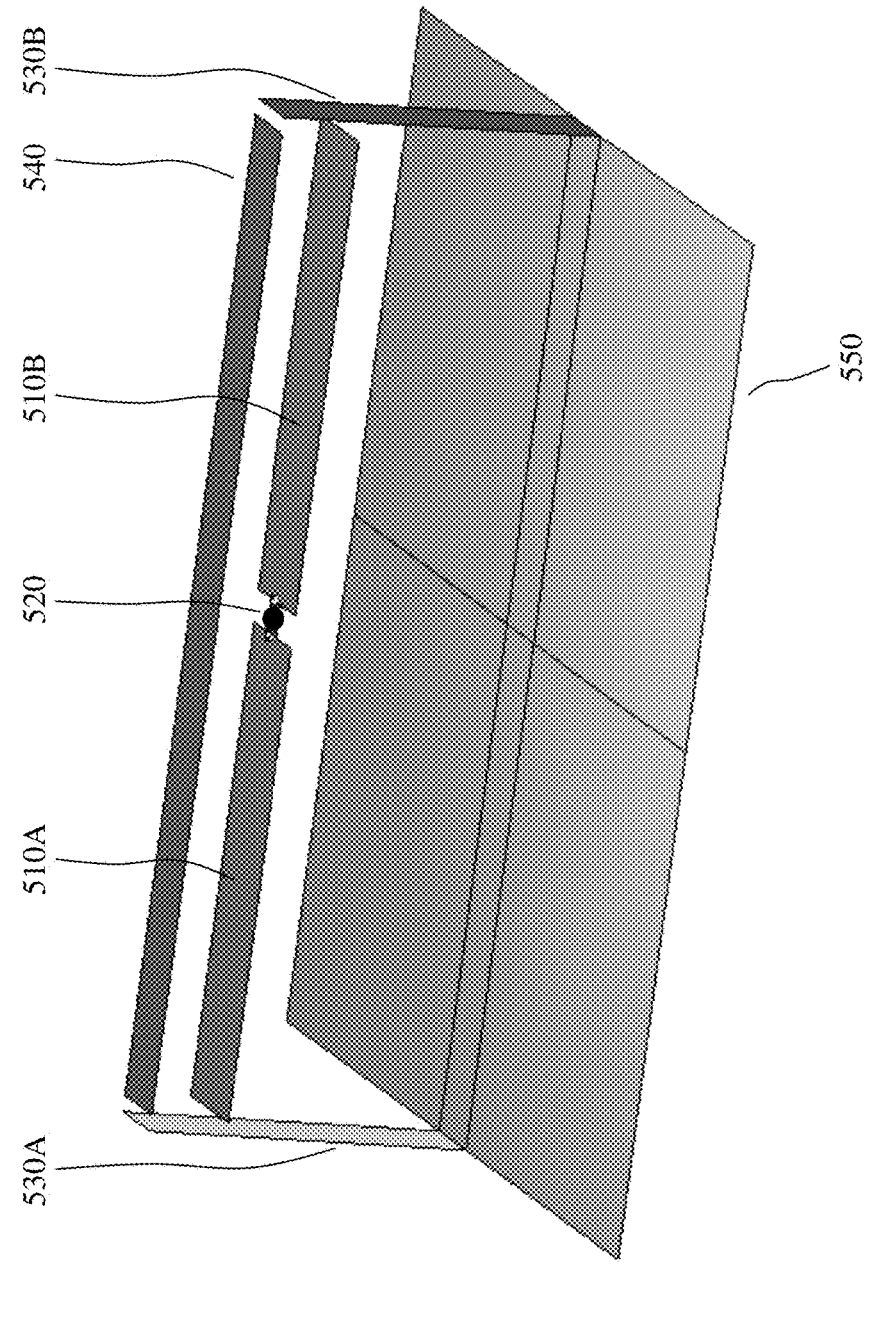
FIG. 5 depicts an exemplary schematic of an inventive broadband antenna according to an embodiment of the invention.

Referring to FIG. 5 there is depicted an exemplary schematic of an inventive Broadband Antenna 500 according to an embodiment of the invention. Accordingly, a dipole comprising first and second Elements 510A and 510B is depicted disposed above and on an axis parallel to a Ground Plane (GP) 550. The first and second Elements 510A and 510B being parallel to and parallel to the plane of the GP 550 and coupled to a Feed Point (FP) 520. Disposed at an end of the first Element 510A distal to the FP 520 is a first Ground Element 530A which is coupled to the Ground Plane 550 and separated from the end of the first Element 510A by a first gap. Disposed at an end of the second Element 510B distal to the FP 520 is a second Ground Element 130B which is coupled to the GP 550 and separated from the end of the second Element 510B by a second gap. The first gap and second gap commonly being equal. Disposed parallel to the first and second Elements 510A and 510B respectively is a Parasitic Element (PE), comprised of linear, planar or complex element 540 whereby the PE 540 is disposed adjacent to the first and second Elements 510A and 510B respectively further from the GP 550. A first end of the PE 540 is separated from the first Ground Element 530A by a third gap. A second distal end of the PE 540 is separated from the second Ground Element 530B by a fourth gap. The third gap and the fourth gap commonly being equal.

Figure 6:
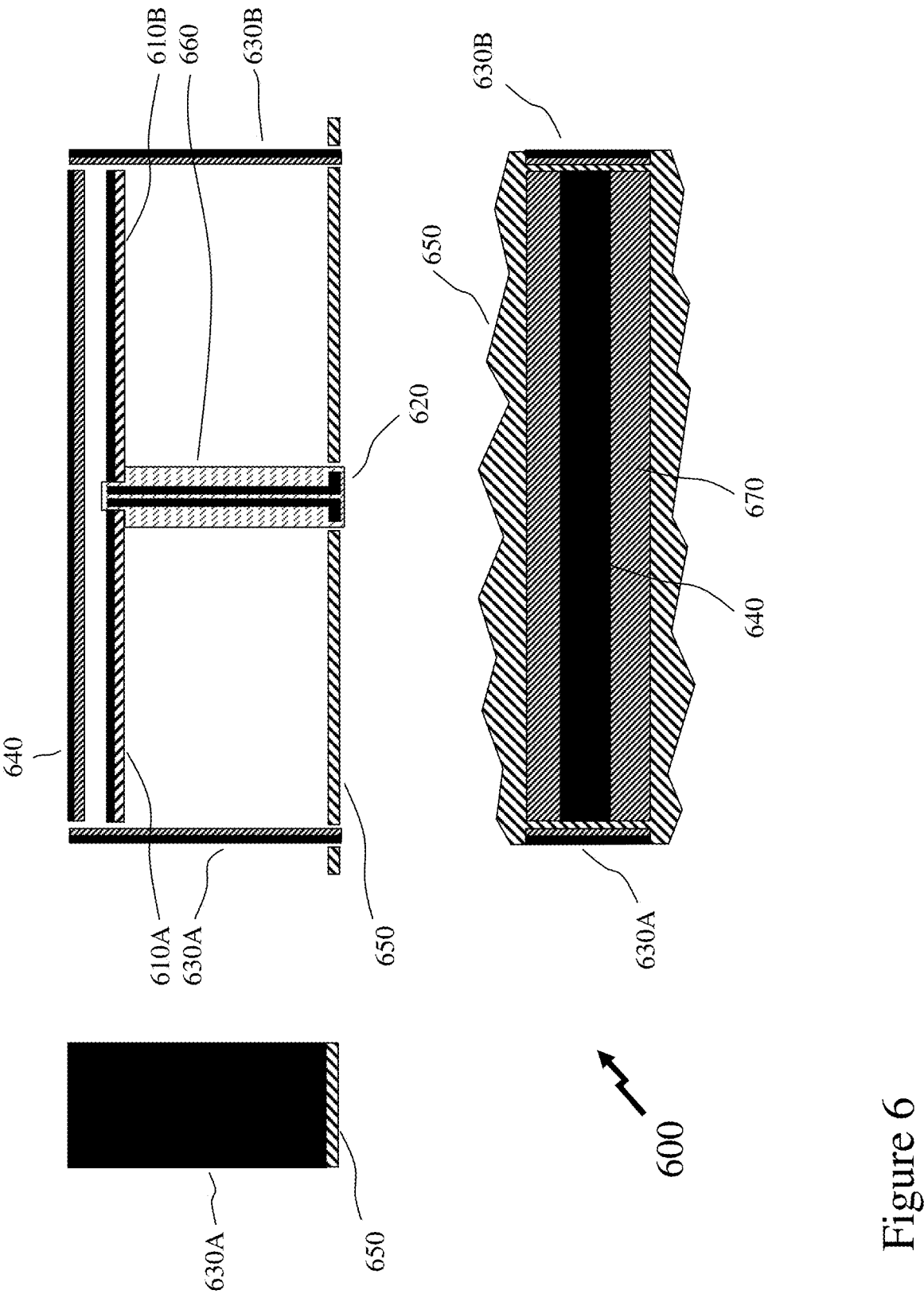
FIG. 6 depicts exemplary cross-section, end elevation and plan view schematics of an inventive broadband antenna according to an embodiment of the invention.

Now referring to FIG. 6 there are depicted an exemplary cross-sections, end elevation and plan view schematics of an inventive Broadband Antenna 600 according to an embodiment of the invention operating according to the principles described above with respect to FIG. 5.

Accordingly, there are depicted the first and second Elements 610A and 610B of the dipole upon a Carrier 660 with tracks to the Feed Point (FP) 620 through an opening in the Ground Plane (GP) 650. The first and second Elements 610A and 610B being parallel to the plane of the GP 650 and coupled to the FP 620. Disposed at an end of the first Element 610A distal to the FP 620 is a first Ground Element 630A which is coupled to the Ground Plane 650 and separated from the end of the first Element 610A by a first gap. Disposed at an end of the second Element 610B distal to the FP 620 is a second Ground Element 630B which is coupled to the GP 650 and separated from the end of the second Element 610B by a second gap. The first gap and second gap commonly being equal. As depicted the first and second Ground Elements 630A and 630B go through openings within the GP 650 and are electrically coupled to the GP 650 (these connections not depicted for clarity).

Also depicted is a Parasitic Element (PE) 640 where a first end of the PE 640 is separated from the first Ground Element 630A by a third gap. A second distal end of the PE 640 is separated from the second Ground Element 630B by a fourth gap. The third gap and the fourth gap commonly being equal.

As evident within the end elevation the first Ground Element 630A is a conductive surface with a width equal to the carrier of the PE 640. The PE 640 metallization as evident from the plan view is upon a Carrier 670 and narrower than the Carrier 670. However, within other embodiments of the invention the Carrier 670 may be the same width as the metallization of the PE 140. Similarly, the ground elements, e.g. first Ground Element 630A in the end elevation, may within other embodiments of the invention be the same width as the metallization of the PE 640.

Figure 7:
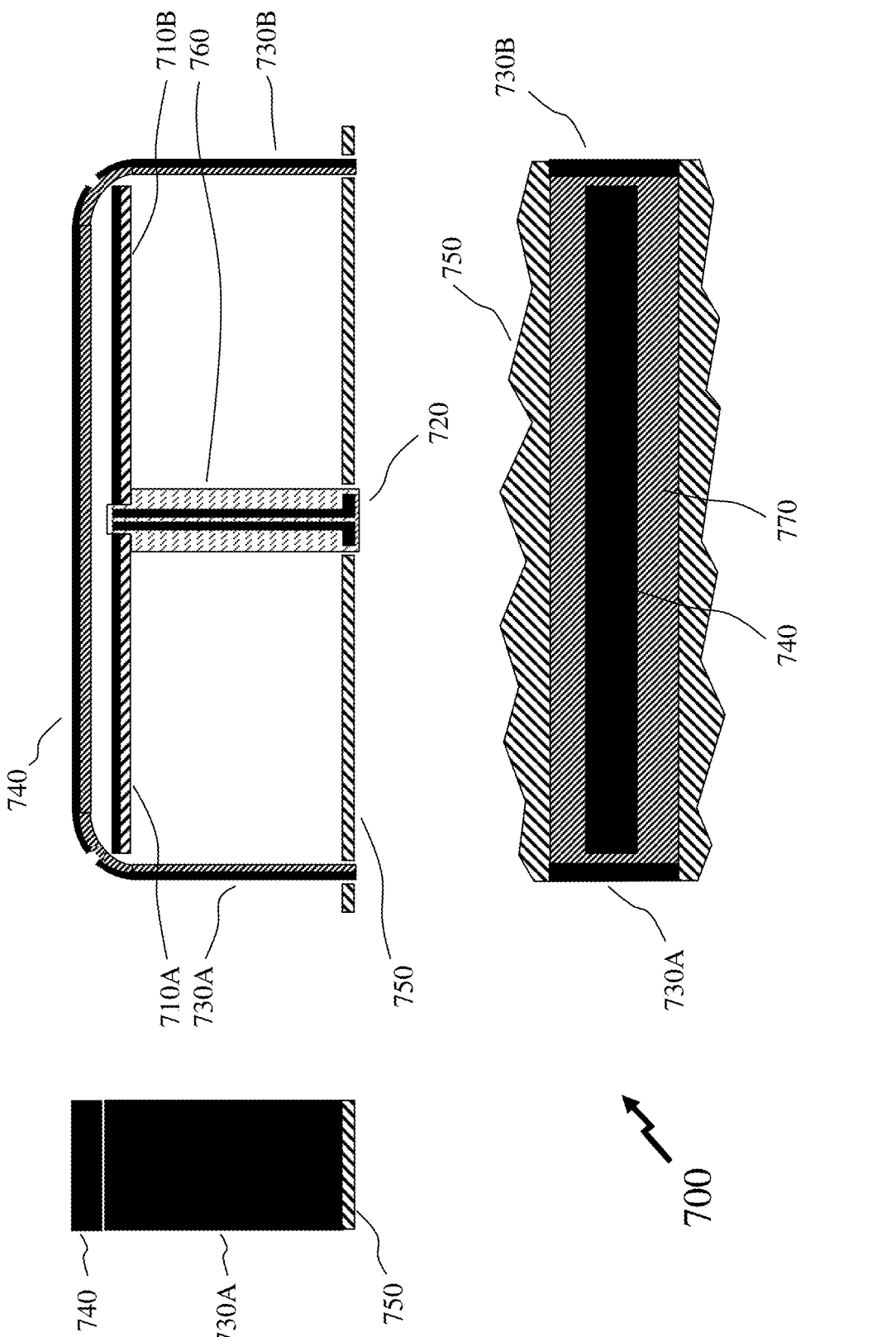
FIG. 7 depicts exemplary cross-section, end elevation and plan view schematics of an inventive broadband antenna according to an embodiment of the invention.

Referring to FIG. 7 there is depicted an exemplary cross-section, end elevation and plan view schematics of an inventive Broadband Antenna 700 according to an embodiment of the invention operating according to the principles described above with respect to FIG. 5.

Accordingly, there are depicted the first and second Elements 710A and 710B of the dipole upon a Carrier 760 with tracks to the Feed Point (FP) 720 through an opening in the Ground Plane (GP) 750. The first and second Elements 710A and 710B being parallel to the plane of the GP 750 and coupled to the FP 720. Disposed at an end of the first Element 710A distal to its connection to the FP 720 is a first Ground Element 730A which is coupled to the Ground Plane 750 and separated from the end of the first Element 710A by a first gap. Disposed at an end of the second Element 710B distal to the end connecting to the FP 720 is a second Ground Element 730B which is coupled to the GP 750 and separated from the end of the second Element 710B by a second gap. The first gap and second gap commonly being equal.

Also depicted is a Parasitic Element (PE) 740 where a first end of the PE 740 is separated from the first Ground Element 730A by a third gap. A second distal end of the PE 740 is separated from the second Ground Element 730B by a fourth gap. The third gap and the fourth gap commonly being equal. As depicted the first Ground Element 730A, PE 740 and second Ground Element 730B are now all disposed upon a common carrier 770 which is shaped to provide a curved profile. In common with Broadband Antenna 600 the PE 740 and first and second Ground Elements 730A and 730B are simple in geometry, i.e. constant width.

Figure 8:
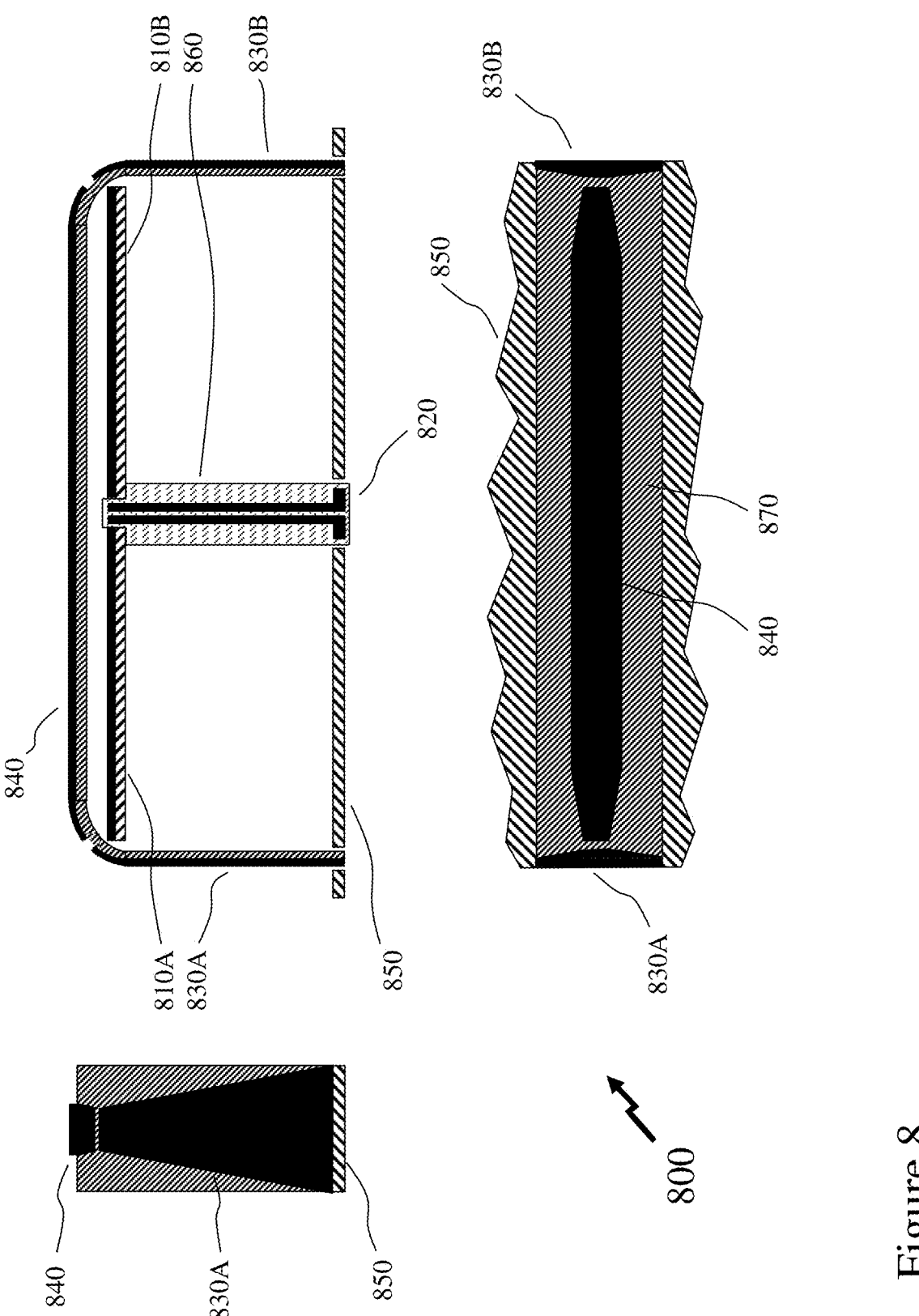
FIG. 8 depicts exemplary cross-section, end elevation and plan view schematics of an inventive broadband antenna according to an embodiment of the invention.

Now referring to FIG. 8 there is depicted an exemplary cross-section, end elevation and plan view schematics of an inventive Broadband Antenna 800 according to an embodiment of the invention operating according to the principles described above with respect to FIG. 5.

Accordingly, there are depicted the first and second Elements 810A and 810B of the dipole upon a Carrier 860 with tracks to the Feed Point (FP) 820 through an opening in the Ground Plane (GP) 850. The first and second Elements 810A and 810B being parallel to the plane of the GP 850 and coupled to the FP 820. Disposed at an end of the first Element 810A distal to the FP 820 is a first Ground Element 830A which is coupled to the Ground Plane 850 and separated from the end of the first Element 810A by a first gap. Disposed at an end of the second Element 810B distal to the FP 820 is a second Ground Element 830B which is coupled to the GP 850 and separated from the end of the second Element 810B by a second gap. The first gap and second gap commonly being equal.

Also depicted is a Parasitic Element (PE) 840 where a first end of the PE 840 is separated from the first Ground Element 830A by a third gap. A second distal end of the PE 840 is separated from the second Ground Element 830B by a fourth gap. The third gap and the fourth gap commonly being equal. As depicted the first Ground Element 830A, PE 840 and second Ground Element 830B are now all disposed upon a common carrier 870 which is shaped to provide a curved profile. In contrast to Broadband Antennae 200 and 300 the PE 840 and first and second Ground Elements 830A and 830B are now more complex in geometry, i.e. tapering to a common width at the point between them. Within other embodiments of the invention the width of the first and second Ground Elements 830A and 830B closest to the respective ends of the PE 840 may be different to the width of the PE 840 at this point between them. Within other embodiments of the invention the geometry of the first and second Ground Elements 830A and 830B and/or the PE 840 may be more complex than the simple linear tapers shown.

Within FIGS. 6 to 8 the ground elements are depicted as going through openings within the ground plane. The ground elements within other embodiments of the invention may not go through openings within the ground plan and may, for example, be electrically coupled to the ground plane through direct electrical connections, through electrical coupling via one or more electrical components, or electromagnetically coupled.

Figure 9:
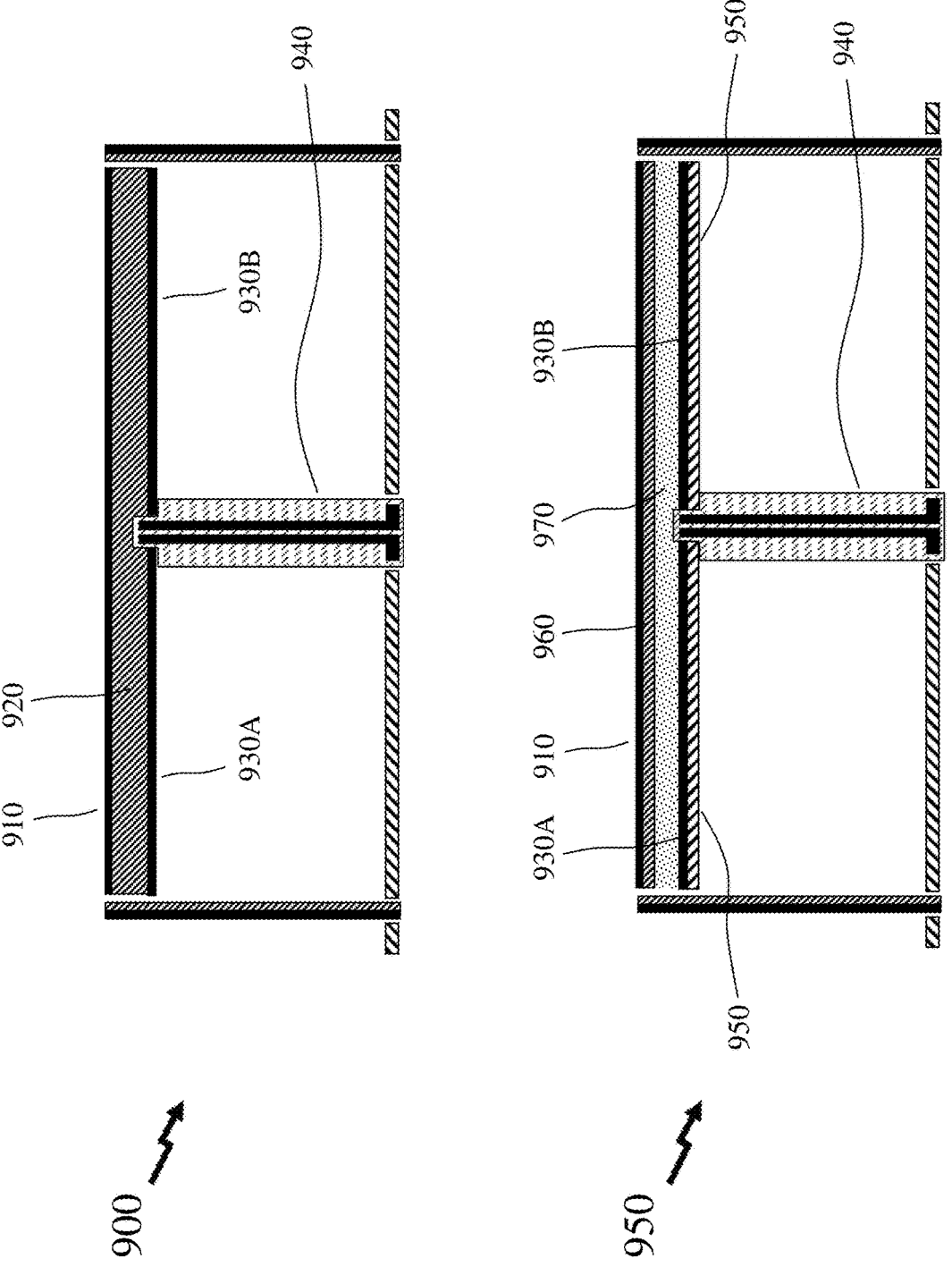
FIG. 9 depicts exemplary cross-section schematics of inventive broadband antennae according to embodiments of the invention.

Referring to FIG. 9 there are depicted an exemplary cross-section schematics of inventive Broadband Antenna 900 and 950 according to embodiments of the invention. Broadband Antenna 900 and 950 are depicted with a cross-sectional view similar to that of Broadband Antenna 500 in FIG. 5. However, it would be evident to one of skill in the art that the variations depicted in FIG. 9 may be applied to other embodiments of the invention such as FIGS. 6 and 7, for example.

Referring to Broadband Antenna 900 in FIG. 9 the first Dipole Element 930A and second Dipole Element 930B of the dipole are disposed on a first side of a Carrier 920, for example a PCB, whilst the Parasitic Element (PE) 910 is disposed on a second side of the Carrier 920. By employing a Carrier 920 with a higher dielectric constant than air the separation between the dipole and PE 910 can be reduced whilst maintaining the desired coupling characteristics between the dipole and the PE 910. The Carrier 920 is supported at its centre by a Feed 940 which has the feed lines for the first and second Elements 930A and 930B of the dipole where the electrical connections between these feed lines and the first and second Elements 930A and 930B of the dipole have been omitted for clarity.

If this design is extended to the Broadband Antennae 700 and 800 then the first Dipole Element 930A and second Dipole Element 930B are disposed upon a first side of the Carrier 920 whilst the PE 910 and the pair of Ground Elements are disposed on a second side of the Carrier 920. Accordingly within other embodiments of the invention the Feed 940 may be omitted and the electrical feed lines for the Feed Point to the dipole integrated onto the Carrier 920 with the first Element 930A and second Element 930B such that they are upon the Carrier 920 and couple to a circuit formed upon a circuit board which may or may not be integrated with the Ground Plane.

Referring to Broadband Antenna 950 in FIG. 9 then the first Element 930A and second element 930B of the dipole are disposed on a first Carrier 950 whilst the parasitic element (PE) 910 is disposed on the another Carrier 960. Disposed between the first Carrier 950 and second Carrier 960 is a Dielectric Medium 970 with a higher dielectric constant than air. This stack of first Carrier 950, Dielectric Medium 970 and second Carrier 960 being supported by Feed 940. As the Dielectric Medium 970 has a higher dielectric constant than air the separation between the dipole and PE 910 can be reduced whilst maintaining the desired coupling characteristics between the dipole and the PE 910.

If this design is extended to the Broadband Antennae 700 and 800 then the PE 910 and the pair of Ground Elements are disposed on the outer surface of the second Carrier 960. Accordingly to the material characteristics of the second Carrier 920 then the Feed 940 may be omitted and the second Carrier 950 with the first Element 930A and second Element 930B is "supported" by virtue of being attached to the inner surface of the Carrier 920 by the Dielectric Medium 970 and the feed point for the dipole is at their mid-point coupled to a coaxial cable, for example.

Optionally, the first Carrier 950 may be dimensioned and shaped to fit within the inner surface of the second Carrier 920 with the Dielectric Medium 970 disposed between them. Accordingly to the material characteristics of the second Carrier 920 then the Feed 940 may be omitted and the electrical feed lines for the dipole integrated onto the first Carrier 920 with the first Element 930A and second Element 930B such that the connections to the external microwave circuit of the transmitter and/or receiver are from an edge of the first Carrier 920.

Figure 10:
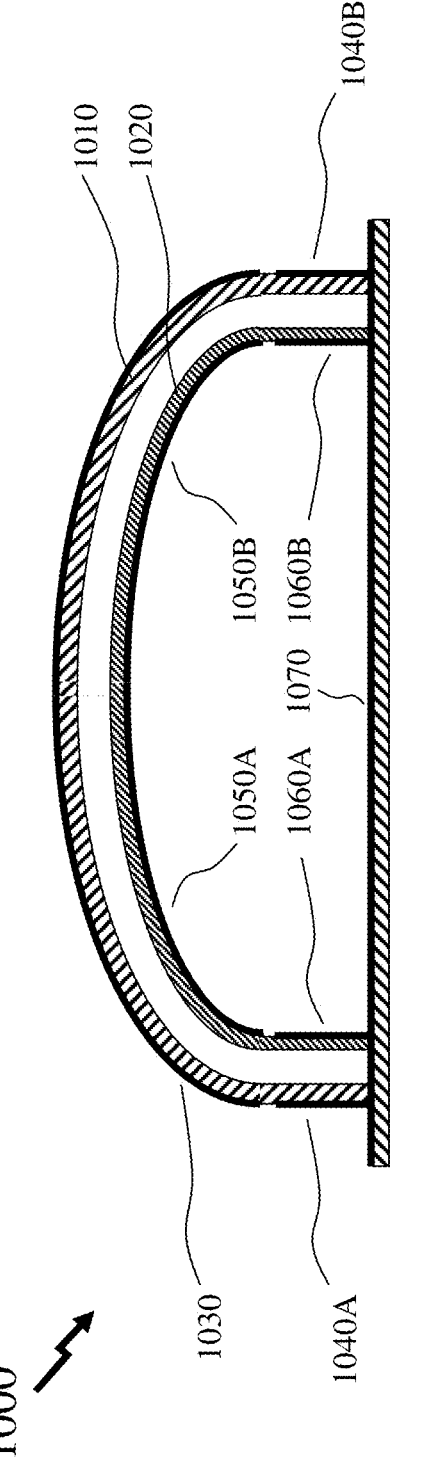
FIG. 10 depicts a cross-section view schematic of an inventive broadband antenna according to a variant of the embodiment of the invention depicted in FIG. 5.

FIG. 10 depicts a cross-section view schematic of an inventive Broadband Antenna 1000 according to another embodiment of the invention depicted in FIG. 5. A first Carrier 1010 has disposed upon it Parasitic Element (PE) 1030 and first and second Ground Elements 1040A and 1040B which extend to and are coupled to the Ground Plane (GP) 1070 and have first and second gaps (not depicted for clarity) between them and the PE 1030. Disposed within the first Carrier 1010 is a second Carrier 1020 upon which are disposed first and second Elements 1050A and 1050B of the dipole together with third and fourth Ground Elements 1060A and 1060B respectively which extend to the Ground Plane (GP) 1070 and have third and fourth gaps (not depicted for clarity) between them and their respective first and second Elements 1050A and 1050B respectively. Optionally, spacers may be disposed between the first Carrier 1010 and second Carrier 1020 to maintain the physical spacing or as depicted with respect to Broadband Antenna 900 in FIG. 9 the first Carrier 1010 and second Carrier 1020 are replaced with a common carrier.

Figures 11A, 11B, 11C:
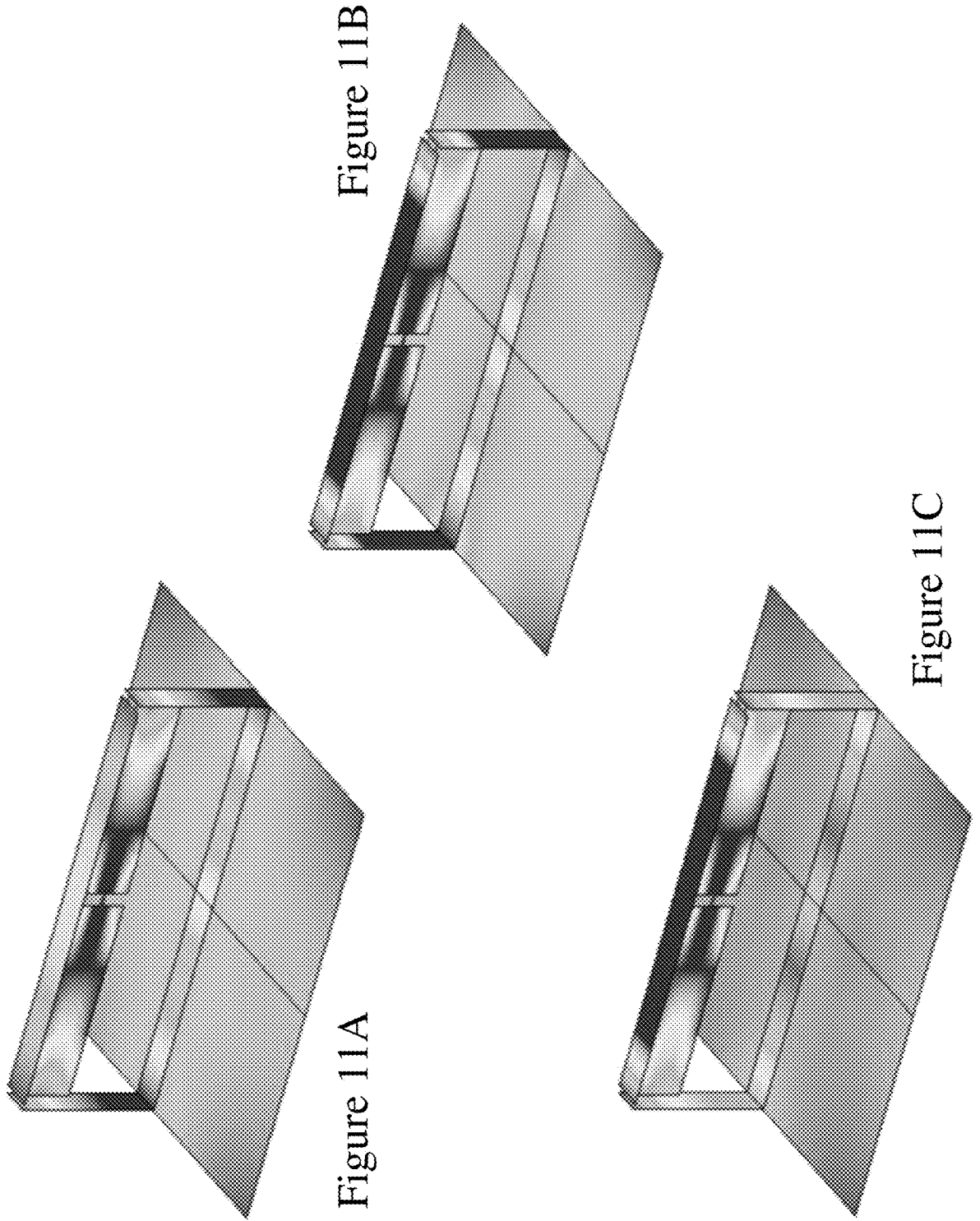
FIGS. 11A-11C depicts simulated current distributions within the inventive broadband antenna according to the embodiment of the invention depicted in FIG. 1 at 1.6 GHz, 1.8 GHz and 2.0 GHz.

Now referring to FIGS. 11A-11C there are depicted simulated current distributions within the inventive broadband antenna according to the embodiment of the invention depicted in FIG. 1 for a defined set of design parameters. FIGS. 11A-11C depicting the current flow within the inventive broadband antenna at 1.6 GHz, 1.8 GHz and 2.0 GHz respectively.

Figures 12A, 12B, 12C:
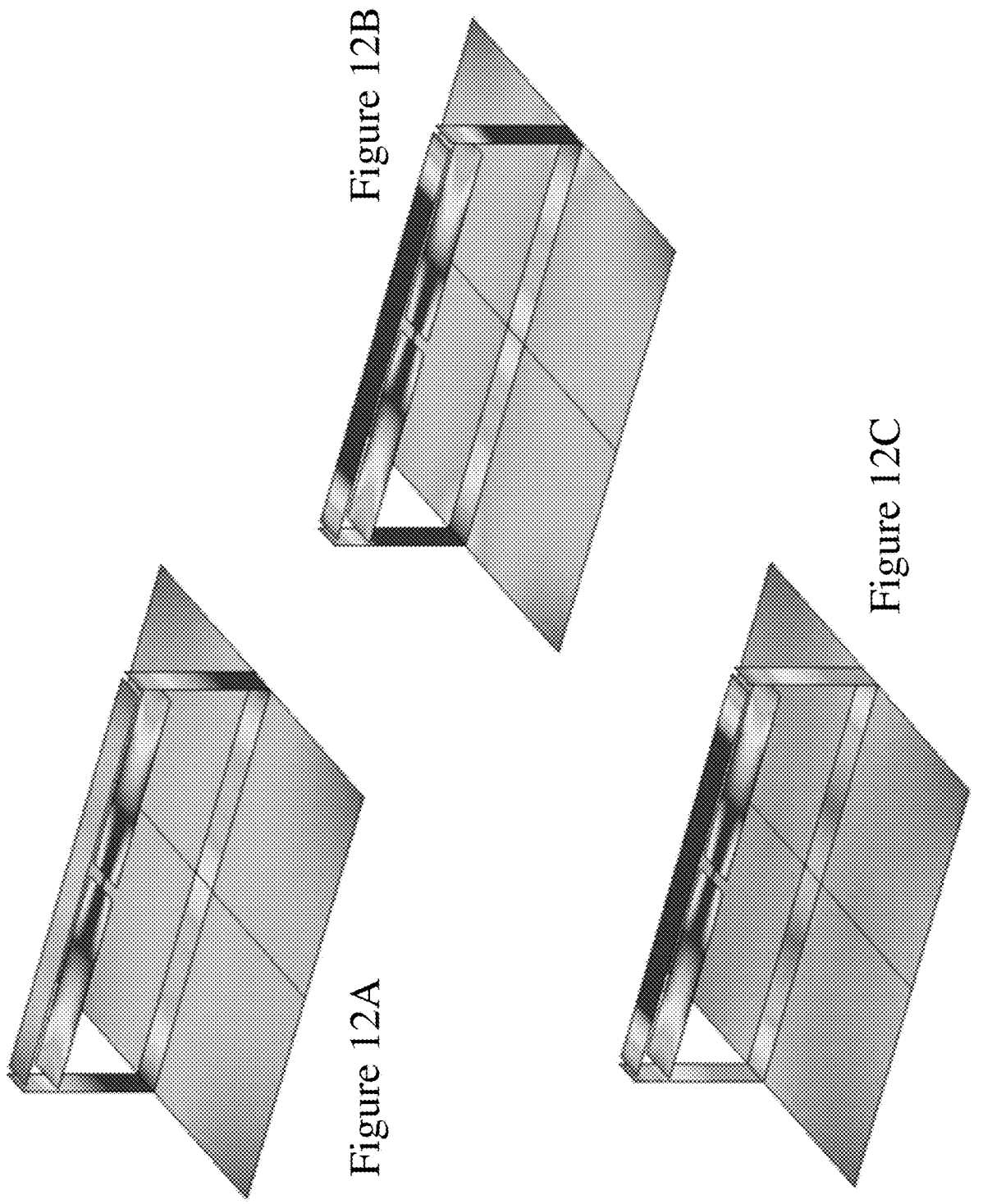
FIGS. 12A-12C depicts simulated current distributions within the inventive broadband antenna according to the embodiment of the invention depicted in FIG. 5 at 1.6 GHz, 1.8 GHz and 2.0 GHz.

Referring to FIGS. 12A-12C there are depicted simulated current distributions within the inventive broadband antenna according to the embodiment of the invention depicted in FIG. 5 for a defined set of design parameters. FIGS. 12A-12C depicting the current flow within the inventive broadband antenna at 1.6 GHz, 1.8 GHz and 2.0 GHz respectively.

Figure 13:
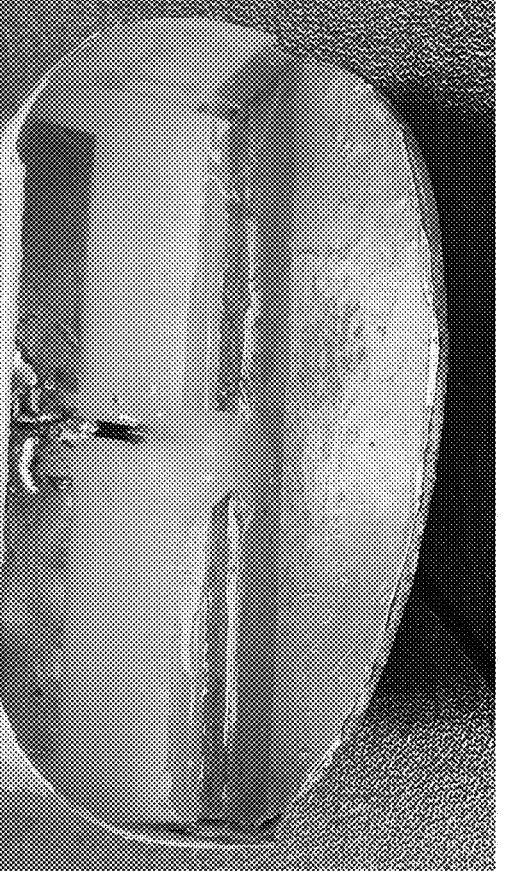
FIG. 13 depicts an optical micrograph of a prototype inventive broadband antenna according to the embodiment of the invention depicted in FIG. 1.

Now referring to FIG. 13 there is depicted an optical micrograph of a prototype inventive broadband antenna according to the embodiment of the invention depicted in FIG. 1.

Figure 14:
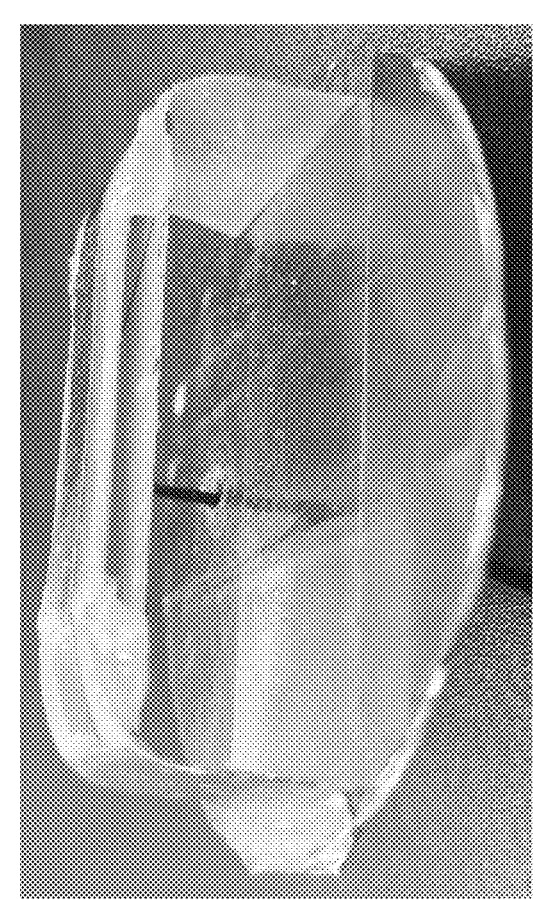
FIG. 14 depicts an optical micrograph of a prototype inventive broadband antenna according to the embodiment of the invention depicted in FIG. 5.

Referring to FIG. 14 there is depicted an optical micrograph of a prototype inventive broadband antenna according to the embodiment of the invention depicted in FIG. 5.

Figure 15:
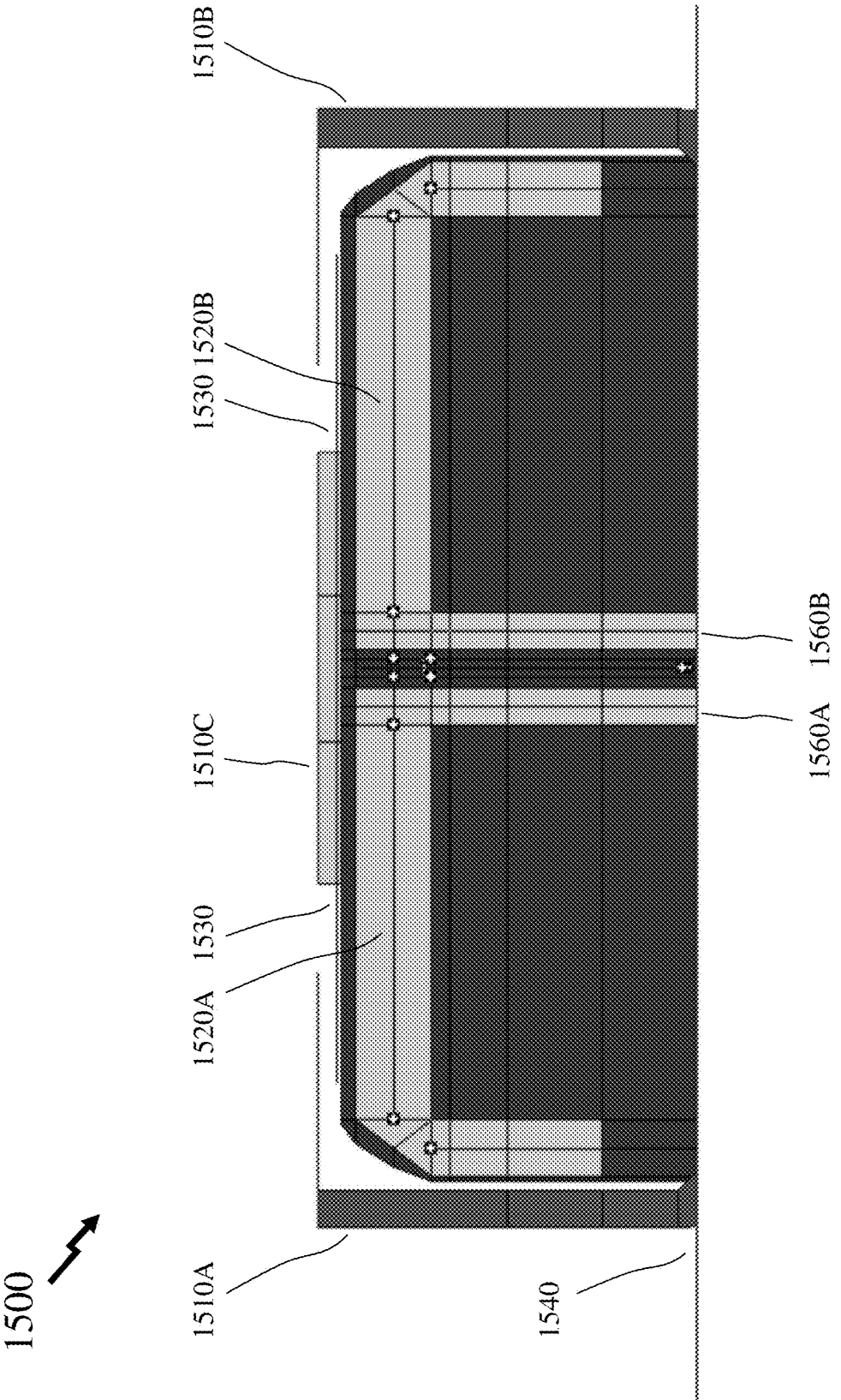
FIG. 15 depicts a front elevation view of an inventive broadband antenna according to an embodiment of the invention.
Figure 16:
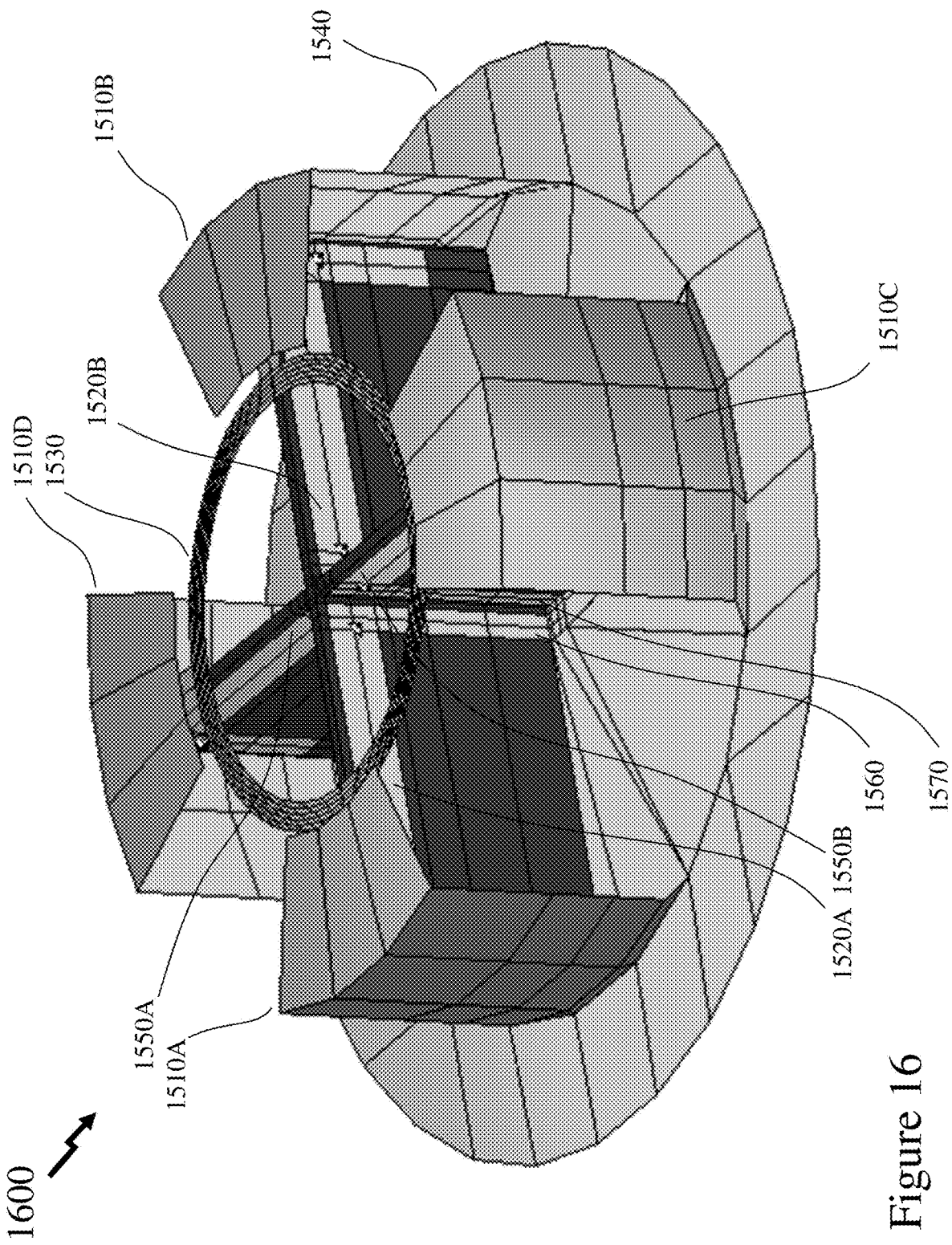
FIG. 16 depicts a perspective view of the inventive broadband antenna according to the embodiment of the invention depicted in FIG. 15.

Now referring to FIG. 15 there is depicted a front elevation view of an inventive Broadband Antenna 1500 according to an embodiment of the invention which is also depicted in FIG. 16 in perspective view. The Broadband Antenna 1500 being an antenna employing dual antenna elements orthogonally disposed for receiving circularly polarized signals. Accordingly, the front elevation depicts a first Ground Element 1510A and a second Ground Element 1510B associated with a first antenna element of the dual antenna elements together with third Ground Element

1510C which is associated with a second antenna element of the dual antenna elements orthogonally disposed relative to the first antenna element.

The first antenna element comprises a first dipole formed from a first Dipole Element 1520A and a second Dipole Element 1520B which are orthogonal to and parallel to a Ground Plane (GP) 1540. The first Dipole Element 1520A and a second Dipole Element 1520B being coupled to a first Feed Point via one or more means as known in the art. The first Dipole Element 1520A is coupled to first Feed 1560 and the second Dipole Element 1520B is coupled to a second Feed, not depicted for clarity, where the first Feed 1560A and second Feed comprise the external connections for the Feed Point of the dipole. Disposed parallel to the first Dipole Element 1520A and a second Dipole Element 1520B is a Parasitic Element (1530) which as depicted extends under the first Ground Element 1510A and second Ground Element 1520A at either end of the first antenna element, said Ground Elements 1510A and 1520A being coupled to said Ground Plane 1540. The PE 1530 has a first separation from each of the first Dipole Element 1520A and second Dipole Element 1520B and a second separation at the distal ends of PE1530 from the first Ground Element 1510A and second ground Element 1510B.

The PE 1530 is coupled to the first dipole formed from a first Dipole Element 1520A and a second Dipole Element 1520B via electromagnetic coupling. The PE 1530 is similarly coupled to the first Ground Element 1510A and second Ground Element 1510B via electromagnetic coupling.

Referring to FIG. 16 there is depicted a perspective view of the inventive Broadband Antenna 1600 according to the embodiment of the invention depicted in FIG. 15.

Accordingly, the Broadband Antenna 1600 comprises first Ground Element 1510A, second Ground Element 1510B, third Ground Element 1510C and fourth Ground Element 1510D disposed at four points around the periphery of the Broadband Antenna 1600.

Figure 17:
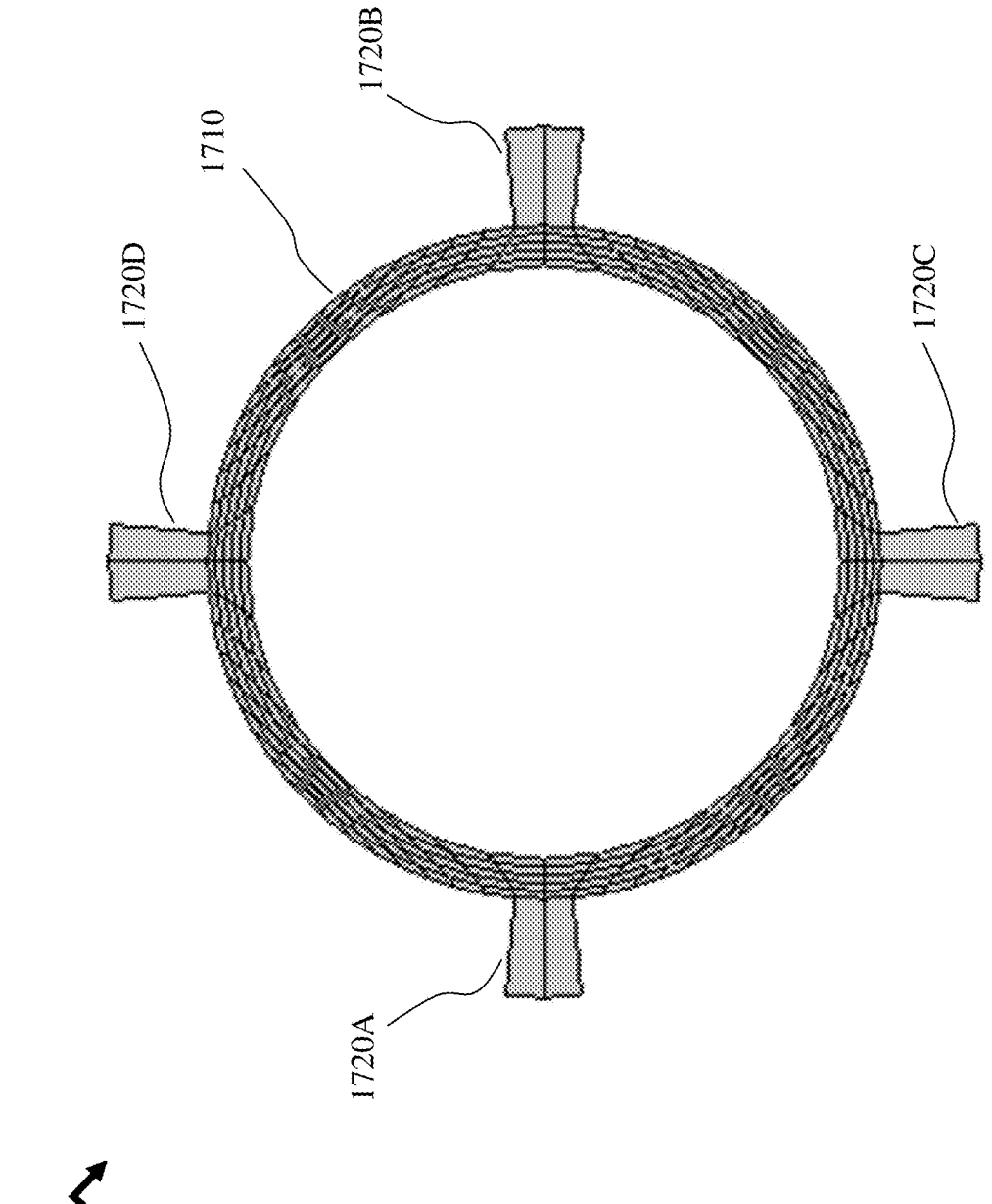
FIG. 17 depicts a plan view of the parasitic element of the inventive broadband antenna according to the embodiments of the invention depicted in FIGS. 15 and 16.

Referring to FIG. 17 there is depicted a plan view of a Parasitic Element (PE) 1700 of the inventive Broadband Antennas 1500 and 1600 according to one embodiments of the invention. PE 1700 is an alternate implementation of the PE 1530 described and depicted with respect to FIGS. 15 and 16. The PE 1700 comprises an annular ring 1710 with four Tab Elements 1710A to 1710D respectively disposed orthogonally around the periphery of the ring. As evident from FIGS. 15 and 16 these Tab Elements extend the PE 1700 under the Ground Elements (GE) 1510A, 1510B, 1510C and 1510D. The ring structure of PE 1700 is effective to extend the path length of the currents that flow along one axis in the plane of the ring relative to the sum distance of the diameter of the ring plus tab extensions.

Other planar or non-planar shapes of a Parasitic Element (PE) as may be conceived to the same effect would lie within and be included in the concepts disclosed herein The first Ground Element 1510A and second Ground Element 1510B are associated with the first antenna element comprising a first dipole formed from first Dipole Element 1520A and second Dipole Element 1520B with a Feed Point of which a sole Feed 1560A is depicted, the other Feed 1560B for the first antenna element being obscured in the perspective view shown.

The third Ground Element 1510C and fourth Ground Element 1510D are associated with the second antenna element, orthogonal to the first antenna element, comprising a second dipole formed from third Dipole Element 1550A and fourth Dipole Element 1550B with a Feed Point of which a sole Feed 1570 is depicted, the other feed for the second antenna element being obscured in the perspective view shown.

Disposed above the first Dipole Element 1520A and second Dipole Element 1520B of the first antenna element and the third Dipole Element 1550A and fourth Dipole Element 1550B of the second antenna element is a Parasitic Element (PE) 1530, see also PE 1770 in FIG. 17. As depicted the PE 1530/PE 1700 comprises a ring with a first axis and a second orthogonal axis in the plane of the ring with four tabs aligned orthogonally to correspond with the rotational positions of each one of the first to fourth Ground Elements 1510A to 1510D respectively (which are obscured by these elements in FIG. 16 but evident in FIG. 17). The first axis of PE 1530/PE 1770 is coupled with a first dipole comprising first Dipole Element 1520A and second Element Dipole 1520B, and further coupled to first Ground Element (GE) 1510A and second Ground Element (GE) 1510B. Similarly, The second axis of PE 1530/PE 1700 is coupled with a second dipole comprising third Dipole Element 1550A and fourth Dipole Element 1550B, and further coupled to third Ground Element (GE) 1510C and fourth Ground Element (GE) 1510D, each of Ground Plane (GP) elements 1510A, 1510B, 1510C, 1510D being further electromagnetically coupled to said Ground Plane (GP) 1540.

Optionally other geometries for the four Tab Elements 1720A to 1720D respectively may be employed. Optionally, within another embodiment of the invention the PE 1700 may be a simple annular ring with defined inner radius and a defined outer radius where the outer radius is defined such that it establishes the desired overlap/electrical coupling to the Ground Elements disposed at the ends of the Dipole Elements. Optionally, this desired overlap/electrical coupling to the Ground Elements from the Parasitic Element 1700 may be achieved without the Parasitic Element 1700 extending under the Ground Elements. Within other embodiments of the invention the Parasitic Element 1700 may be disposed such that the portion overlapping the Ground Elements is further away from the Ground Plane than the Ground Elements. Within other embodiments of the invention the Parasitic Element 1700 may be disposed such that it is closer to the Ground Plane than the Dipole Elements and coupled to the Ground Elements at its periphery or through tabs/extensions that provide increased electrical coupling to the ground plane. Optionally, the Ground Elements may be disposed between the Parasitic Element 1700 and the Dipole Elements with the Parasitic Element closer to the Ground Plane than the Dipole Elements.

Whilst the inventive broadband antenna described and depicted in FIGS. 15 to 17 respectively employs a dipole configuration such as that depicted in FIG. 1 it would be evident that the dipole configuration may also be as depicted in FIG. 5 without departing from the scope of the invention. Similarly, the concepts described and depicted in respect of FIGS. 2-10 for other mechanical configurations may be extended to the concepts described and depicted in FIGS. 15-17 without departing from the scope of the invention.

Within FIGS. 15 to 17 the inventive broadband antennas according to embodiments of the invention replace the linear parasitic elements (PE) of the broadband antennas described within FIGS. 1 to 14 with a conducting planar geometry which is parallel to the ground plane where the conducting planar geometry is concentric with and symmetrically disposed with respect to an antenna centre. Optionally, linear extensions, e.g. first to fourth Tab Elements 1720A to 1720D respectively in FIG. 17, may be disposed coaxially with the dipole(s) of the broadband antenna. The structure of the Parasitic Element 1700 provides for a redirection and lengthening of the current path within the Parasitic Element to provide an advantageous improvement in the electromagnetic response of the broadband antenna according to embodiments of the invention.

Figures 18, 19:
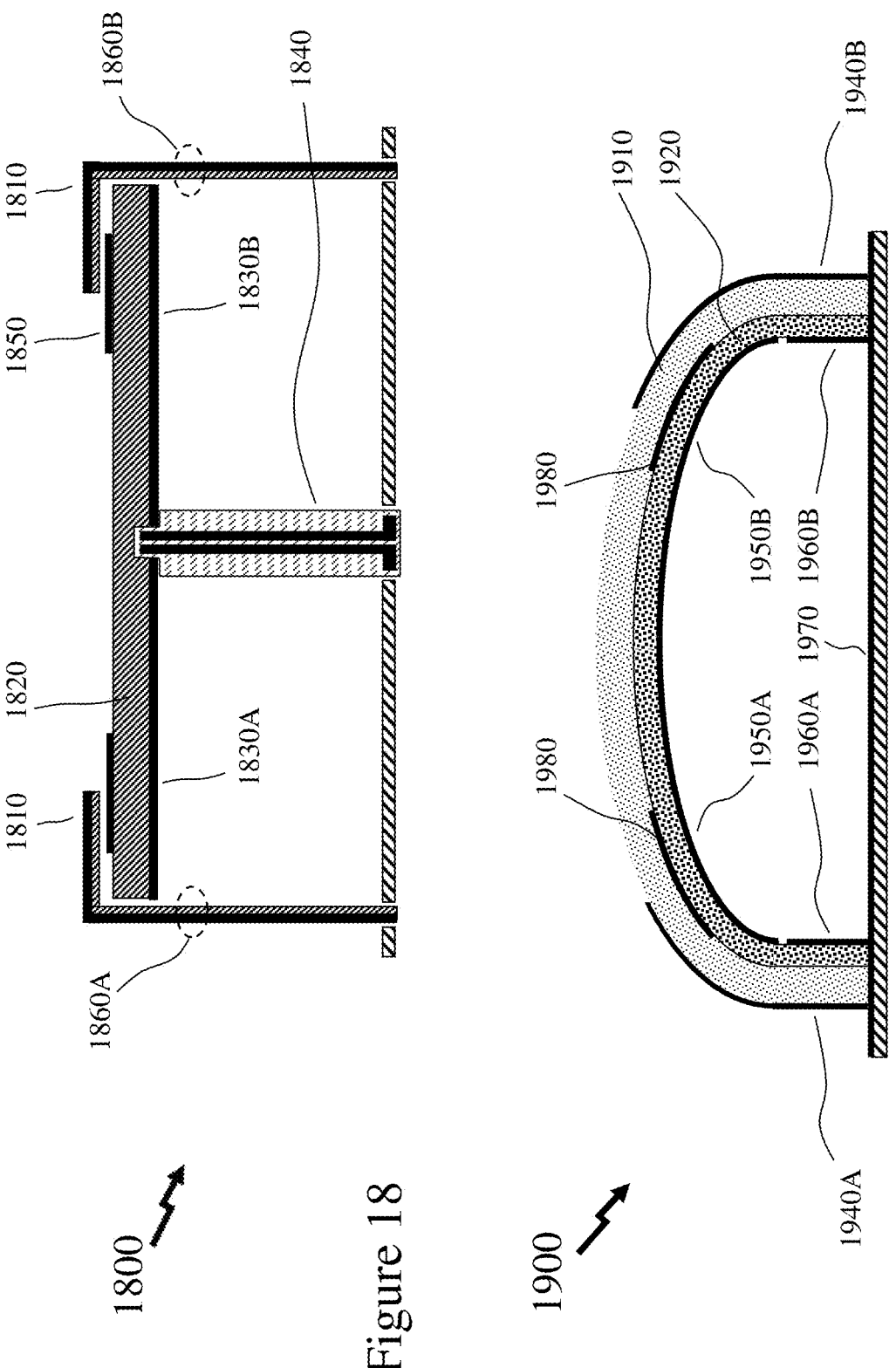
FIG. 18 depicts an exemplary cross-section schematic of inventive broadband antenna according to embodiments of the invention.
FIG. 19 depicts a cross-section view schematic of an inventive broadband antenna according to a variant of the embodiment of the invention depicted in FIGS. 15 to 17 employing the dipole configuration depicted in FIG. 5.

Referring to FIG. 18 there is depicted an exemplary cross-section schematic of inventive broadband antenna according to embodiments of the invention. Referring to Broadband Antenna 1800 in FIG. 18 the first Dipole Element 1830A and second Dipole Element 1830B of the dipole are disposed on a first side of a Carrier 1820, for example a PCB, whilst the Parasitic Element (PE) 1850 is disposed on the other side of the Carrier 1820. By employing a Carrier 1820 with a higher dielectric constant than air the separation between the dipole and PE 1850 can be reduced whilst maintaining the desired coupling characteristics between the dipole and the PE 1850. The Carrier 1820 is supported at its centre by a Feed 1840 which has the feed lines for the first and second Dipole Elements 1830A and 1830B of the dipole where the electrical connections between these feed lines and the first and second Elements 1830A and 1830B of the dipole have been omitted for clarity. The first and second Ground Elements 1860A and 1860B disposed at the periphery are formed from another Carrier or Carriers and have a Ground Plane 1810. Optionally, the Ground Plane 1810 may be disposed without a Carrier or Carriers or the Ground Plane 1810 may be on the inner surface of each of the first and second Ground Elements 1860A and 1860B.

Now referring to FIG. 19 there is depicted a cross-section view schematic of an inventive broadband antenna according to a variant of the embodiment of the invention depicted in FIGS. 15 to 17 employing the dipole configuration depicted in FIG. 5. A first Carrier 1910 has disposed upon one side Parasitic Element (PE) 1980 and first and second Ground Elements 1940A and 1940B which extend to the Ground Plane (GP) 1970 and whilst directly coupled as depicted may be electrically coupled via electromagnetic coupling for example. Disposed within the first Carrier 1910 is a second Carrier 1920 upon which are disposed first and second Dipole Elements 1950A and 1950B of the dipole together with third and fourth Ground Elements 1060A and 1060B respectively which similarly extend to the GP 1970. Accordingly, first Carrier 1910 and second Carrier 1920 provide the mechanical support for the various electrical structures.

As depicted the first Carrier 1910 and second Carrier 1920 are in contact with one another although within another embodiment of the spacers may be disposed between the first Carrier 1010 and second Carrier 1020 to maintain the physical spacing. Optionally, the PE 1980 may be formed upon the second Carrier 1920 rather than the first Carrier 1910. Optionally, the first Carrier 1910 and second Carrier 1920 may be layers of a multi-layer circuit board.

Within FIGS. 1 to 19 the ground elements which form current loops with the ground plane, dipole and/or parasitic element are depicted disposed radially away from the ends of the dipole and/or parasitic element. Whilst this enables designs such as depicted in FIGS. 3-4 and 7-8 to employ simple formers (carriers) for their metallization and that of the parasitic element it would be evident that other geometries may be possible without departing from the scope of the invention. For example, the ground elements may be adjacent to the distal ends of the dipole and/or parasitic element such that their radial distance from a centre of the broadband antenna is not larger than that of the dipole and/or parasitic element.

Within FIGS. 1 to 19 the parasitic element has been depicted as a single element. However, it would be evident that within other embodiments of the invention the parasitic element may be multiple parasitic elements coupled to the dipole disposed parallel and/or longitudinal to the axis of the dipole.

Within FIGS. 1 to 19 the antenna elements and antennas employing them exploit one or more elements which are coupled to a feed point and are disposed relative to a ground plane and one or more ground elements which are coupled to the ground plane. Within embodiments of the invention this ground plane may be formed, for example, on one side of or upon a layer of a printed circuit board or electronic circuit, flexible PCB, or an equivalent, hereinafter referred to as a PCB for case of reference. Within embodiments of the invention the elements and/or ground elements are mechanically and/or electrically coupled to the other side of the PCB to that on which the ground plane is formed or upon a side of the PCB when the ground plane is formed by a layer within the PCB. Accordingly, the PCB may be a single or multi-layer circuit providing contacts for electrical attachment of each of the elements and/or ground elements and therein the individual element and/or ground element. Further, the PCB may support either integrated within it or attached to it capacitors to provide the capacitive series reactance from the feed points to the elements.

Within the embodiments of the invention described above with respect to FIGS. 1 to 17 the parasitic element is depicted as capacitively coupled to the dipole, this being one embodiment of electromagnetically coupling the parasitic element to the dipole. Accordingly, it would be evident to one of skill in the art that the parasitic element may be coupled to the dipole with other electromagnetic coupling methods and approaches as known in the art without departing from the scope of the invention.

Within the embodiments of the invention described above with respect to FIGS. 1 to 14 the structure may be implemented wherein one or more of the first gap and third gap are equal; the second gap and fourth gap are equal; the first gap, second gap, third gap, and fourth gap are all equal; the first gap and third gap are different; the second gap and fourth gap are different; the first gap, second gap, third gap, and fourth gap are all different.

Within the embodiments of the invention described above with respect to FIGS. 1 to 19 the structure has been described with the parasitic element, e.g. Parasitic Element 140 in FIG. 1 or Parasitic Element 1530 in FIG. 16, further from the ground plane, e.g. Ground Plane 150 or Ground Plane 1540, than the dipole. However, it would be evident to one of skill in the art that the antenna structures described and depicted according to embodiments of the invention may also be implemented the parasitic element closer to the ground plane than the dipole.

Figures 20, 21:
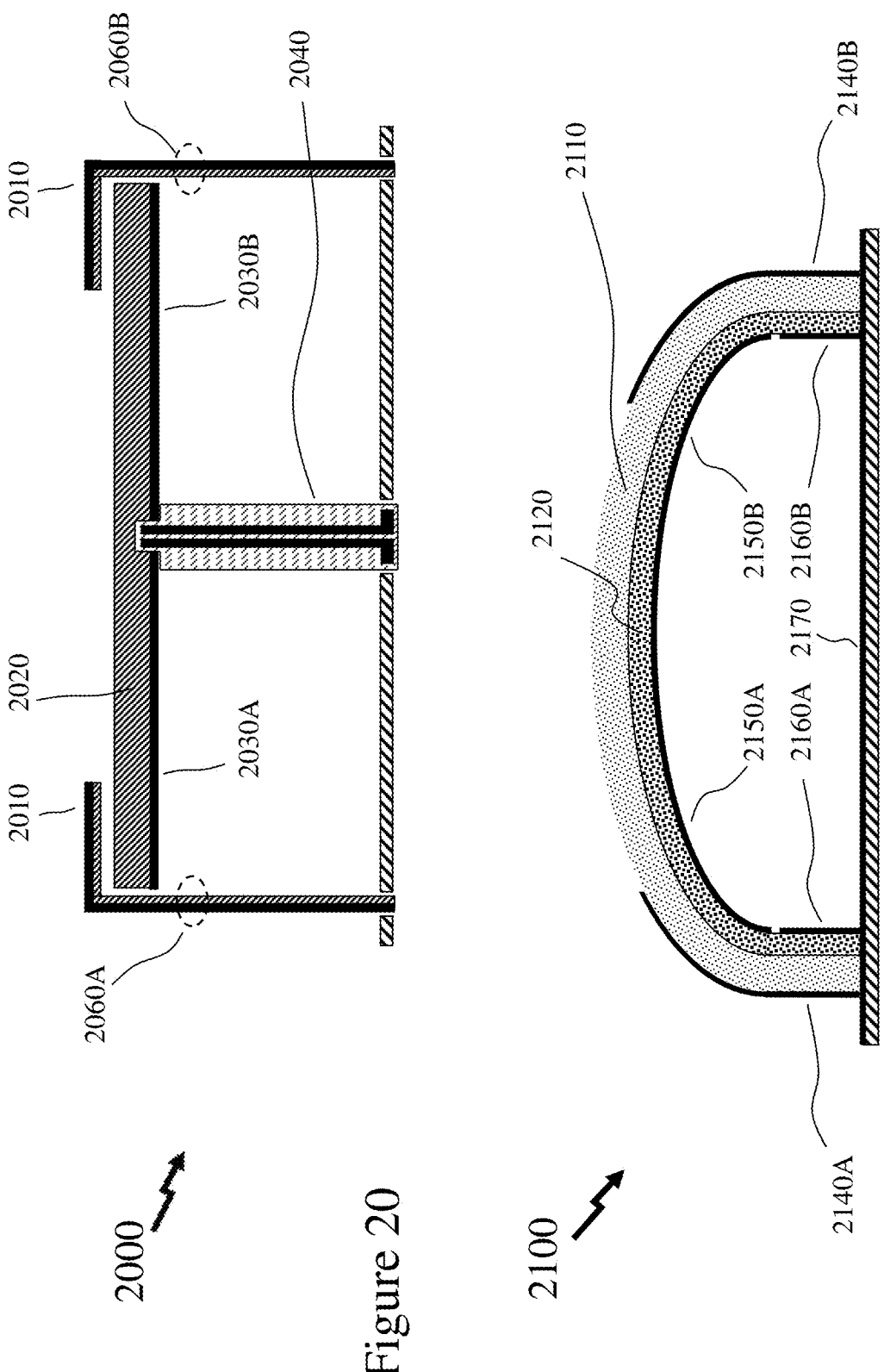
FIG. 20 depicts an exemplary cross-section schematic of inventive antenna according to an embodiment of the invention.
FIG. 21 depicts a cross-section view schematic of an inventive antenna according to a variant of the embodiment of the invention depicted in FIG. 20.

Now referring to FIG. 20 there is depicted an exemplary cross-section schematic of inventive Antenna 2000 according to an embodiment of the invention. Referring to Antenna 2000 in FIG. 20 the first Dipole Element 2030A and second Dipole Element 2030B of the dipole are disposed on a first side of a Carrier 2020, for example a PCB. By employing a Carrier 2020 with a higher dielectric constant than air the separation between the dipole and the first and second Ground Elements 2060A and 2060B can be reduced whilst maintaining the desired coupling characteristics between the dipole and the first and second Ground Elements 2060A and 2060B thereby allowing the height of Antenna 2000 to be reduced. The Carrier 2020 is supported at its centre by a Feed 2040 which has the feed lines for the first and second Dipole Elements 2030A and 2030B of the dipole where the electrical connections between these feed lines and the first and second Elements 2030A and 2030B of the dipole have been omitted for clarity.

The first and second Ground Elements 2060A and 2060B are disposed at the periphery of the Antenna 2000 and are formed from another Carrier or Carriers upon which is disposed a Ground Plane 2010. Within other embodiments of the invention the Ground Plane 2010 may be employed without a Carrier or Carriers such that the first and second Ground Elements 2060A and 2060B are simply discrete Ground Planes 2010. Optionally, the Ground Planes 2010 may be disposed on the inner surface of each of the first and second Ground Elements 1860A and 1860B.

The first Ground Element 2060A extends over the first Dipole Element 2030A for a predetermined distance such that the Ground Plane 2010 extends over the first Dipole Element 2030A for another predetermined distance which may be the same as the predetermined distance or different. Similarly, the second Ground Element 2060B extends over the second Dipole Element 2030B for a predetermined distance such that the Ground Plane 2010 extends over the second Dipole Element 2030B for another predetermined distance. In this manner the microwave/RF performance of the first and second Dipole Elements 2030A and 203B are adjusted in dependence upon the degree of overlap of the Ground Plane 2010 to them such that the antenna gain of the Antenna 2000 is enhanced for the desired operating frequencies and/or enhanced for specific ranges of elevation. For example, the Antenna 2000 may be designed to operate upon the uplink and/or downlink bands of a GNSS system such as INMARSAT where a pair of dual orthogonal Antennae 2000 are employed to support the required right-hand circular polarization. For INMARSAT the uplink frequency band is 1626.5-1660.5 MHz whilst the downlink frequency band is 1525.0-1559.0 MHz such that these sit either side of the GPS L1 signal operating at 1.563-1.587 GHz.

Referring to FIG. 21 depicts a cross-section view schematic of an inventive Antenna 2100 according to a variant of the embodiment of the invention depicted in FIG. 20. A first Carrier 2110 has disposed upon one side first and second Ground Elements 2140A and 2140B which extend to the Ground Plane (GP) 2170 and whilst the connections between the GP 2170 and the first and second Ground Elements 2140A and 2140B are shown as being directly electrically coupled these may within other embodiments of the invention be electrically coupled via electromagnetic coupling for example. In a similar manner the Ground Planes 2010 of Antenna 2000 may be coupled to a ground trace (not depicted for clarity) either directly or indirectly through electromagnetic coupling.

Disposed within the first Carrier 2110 is a second Carrier 2120 upon which are disposed first and second Dipole Elements 2150A and 2150B of the dipole together with third and fourth Ground Elements 1060A and 1060B respectively which similarly extend to the GP 2170. Accordingly, first Carrier 2110 and second Carrier 2120 provide the mechanical support for the various electrical structures. As depicted the first Carrier 2110 and second Carrier 2120 are in contact with one another although within other embodiment a physical spacing may be present between the first Carrier 1010 and second Carrier 1020 which may or may not comprise physical spacers discretely or formed within one or both of the first Carrier 1010 and second Carrier 1020. Optionally, the first Carrier 2110 and second Carrier 2120 may be layers of a multi-layer circuit board.

Figure 22:
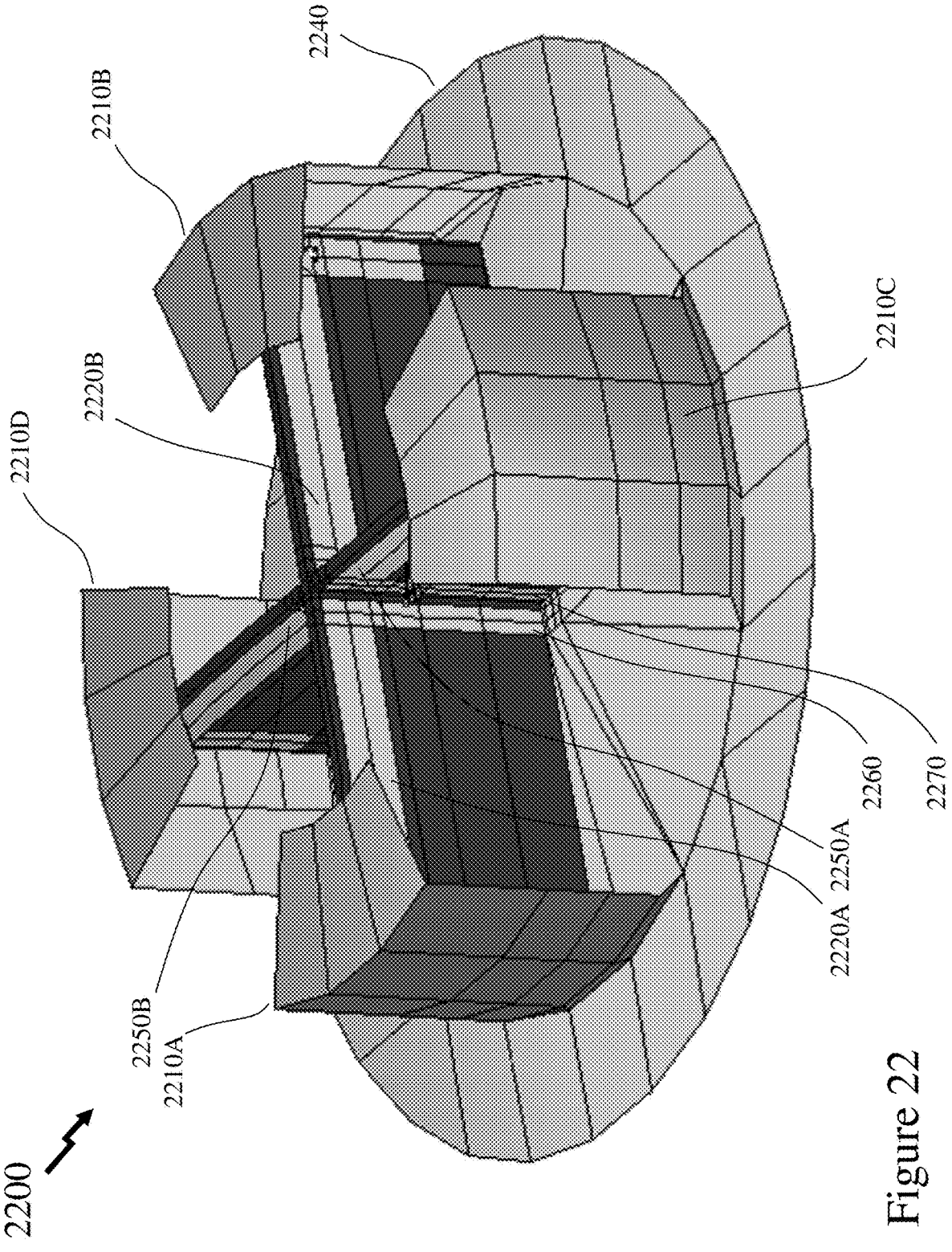
FIG. 22 depicts a perspective view of the inventive antenna according to the embodiment of the invention depicted in FIG. 20.

Now referring to FIG. 22 there is depicted a perspective view of the inventive Antenna 2200 according to the embodiment of the invention depicted in FIG. 20. The Antenna 2200 employs a pair of Antenna 2000 mounted orthogonally in order to provide an antenna operating upon circularly polarized signals.

A first antenna element, a first instance of Antenna 2000, comprises a first dipole formed from a first Dipole Element 2220A and a second Dipole Element 2220B which are orthogonal to and parallel to a Ground Plane (GP) 2240. The first Dipole Element 2220A and the second Dipole Element 2220B being coupled to a first Feed Point via one or more means as known in the art. The first Dipole Element 2220A is coupled to first Feed 2260 and the second Dipole Element 2220B is coupled to a second Feed, not visible within the perspective view, where the first Feed 2260 and second Feed comprise external connections for the Feed Point of the dipole. Also depicted in association with the first Dipole Element 2220A and the second Dipole Element 2220B are a first Ground Element 2210A and a second Ground Element 2210B. The first Ground Element 2210A and second Ground Element 2220A extend over the first Dipole Element 2220A and the second Dipole Element 2220B respectively and are each coupled to the Ground Plane 2240. The first Ground Element 2210A and second Ground Element 2220A are depicted as being directly electrically coupled to the Ground Plane 2240 but these may, within other embodiments of the invention, be electromagnetically coupled.

A second antenna element, a second instance of Antenna 2000, comprises a second dipole formed from a third Dipole Element 2250A and a fourth Dipole Element 2250B which are orthogonal to and parallel to a Ground Plane (GP) 2240. The third Dipole Element 2250A and the second Dipole Element 2220B being coupled to a second Feed Point via one or more means as known in the art. The third Dipole Element 2250A is coupled to third Feed 2270 and the fourth Dipole Element 2250B is coupled to a fourth Feed, not visible within the perspective view, where the third Feed 2270 and fourth Feed comprise external connections for the second Feed Point of the dipole. Also depicted in association with the third Dipole Element 2250A and the fourth Dipole Element 2250B are a third Ground Element 2210C and a fourth Ground Element 2210D. The third Ground Element 2210C and fourth Ground Element 2220D extend over the third Dipole Element 2250A and the fourth Dipole Element 2250B respectively and are each coupled to the Ground Plane 2240. The third Ground Element 2210C and fourth Ground Element 2220D are depicted as being directly electrically coupled to the Ground Plane 2240 but these may, within other embodiments of the invention, be electromagnetically coupled.

Within the embodiments of the invention described above with respect to FIGS. 1 to 14 the structure has been described from the viewpoint or perspective of a receiver of microwave or radio frequency (RF) signals. However, it would be evident to one of skill in the art that the antenna structures described and depicted according to embodiments of the invention may be employed with a transmitter of microwave or RF signals as well as a transceiver for microwave or RF signals.

Within the embodiments of the invention a former, i.e. a carrier or PCB, for either a dipole or a pair of cross dipoles or three of more dipoles arranged radially may be designed and formed evenly distribute around the periphery of a surface and form the antennas across this surface. Within embodiments of the invention with a pair of dipoles orthogonally disposed for circularly polarized microwave signals the former may be designed and formed to provide the pair of parasitic elements distributed around and across its surface. Within the embodiments presented the surface may be quasi-rectangular or quasi-hemispherical. However, within other embodiments of the invention the surface may be a frusto-conical surface, an ellipsoidal surface or another surface either by a regular polygon, irregular polygon or one or more mathematical functions, etc. Within other embodiments of the invention the former may be designed and formed to provide N dipole antennas, where N is a positive integer, evenly distributed around the periphery of a polygonal surface and form the antennas across this polygonal surface.

Such a polygonal surface may have 2N sides or other numbers although typically more sides yield lower angular transitions and hence reduced induced stress and/or fatigue in the former. In a similar manner a former for the parasitic element or parasitic elements may be designed in a similar manner as that described above for the dipoles.

Optionally, the dipole(s) and/or parasitic element(s) may exploit mechanical structures such as those depicted within PCT/CA202/051188 by the inventor (published as WO/2021/046,635) to provide PCBs for the dipole(s) which support a former having metallization for the parasitic element and ground elements disposed upon it.

It would be evident to one of skill in the art that the filar elements are electrical conductors (conductors) formed from a suitable conductive material or combination of conductive materials in alloy and/or layered form. Such conductive materials may include, but not be limited to, copper, gold, silver, aluminum, titanium, tungsten, platinum, palladium, and zinc.

Specific details are given in the above description to provide a thorough understanding of the embodiments. However, it is understood that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

The foregoing disclosure of the exemplary embodiments of the present invention has been presented for purposes of illustration and description. It is not intended to be exhaustive or to limit the invention to the precise forms disclosed. Many variations and modifications of the embodiments described herein will be apparent to one of ordinary skill in the art in light of the above disclosure. The scope of the invention is to be defined only by the claims appended hereto, and by their equivalents.

Further, in describing representative embodiments of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied and still remain within the spirit and scope of the present invention.

What is claimed is:

1. An antenna comprising:

a ground plane;

a dipole comprising a first element and a second element;

a feed point centrally disposed between a first end of the first element and a first end of the second element coupled to the first end of the first element and the first end of the second element;

a parasitic element disposed parallel to the dipole having a first end disposed proximate a second distal end of the first element and a second distal end disposed proximate a second distal end of the second element;

a first ground element coupled at a first end to the ground plane disposed proximate the second distal end of the first element and proximate the first end of the parasitic element;

a second ground element coupled at a first end to the ground plane disposed proximate the second distal end of the second element and proximate the second end of the parasitic element.

2. The antenna according to claim 1, wherein the first element and second element of the dipole are aligned along an axis parallel to the ground plane; and the first element and second element have a width of their metallization greater than a thickness of the metallization; and the first element and second element are orientated such that either their width is along an axis orthogonal to the ground plane or along an axis parallel to the ground plane.

3. The antenna according to claim 1, wherein the second distal end of the first element is separated from the first ground element by a first gap;

the first end of the parasitic element is separated from the first ground element by a second gap;

the second distal end of the second element is separated from the second ground element by a third gap;

the second end of the parasitic element is separated from the second ground element by a fourth gap; and the parasitic element extends along the length of dipole from the second distal end of the first element to the second distal end of the second element.

4. The antenna according to claim 1, wherein the parasitic element is disposed closer to the ground plane than the first element and second element of the dipole.

5. The antenna according to claim 1, wherein either:

a portion of the first ground element is disposed between the second distal end of the first element and the first end of the parasitic element; and a portion of the second ground element is disposed between the second distal end of the second element and the second end of the parasitic element;

or:

the first end of the parasitic element is disposed between the second distal end of the first element and a portion of the first ground element; and the second end of the parasitic element is disposed between the second distal end of the second element and a portion of the second ground element.

6. A magnetic dipole responsive to a linear magnetic field comprising:

a ground plane;

a dipole comprising a first element and a second element disposed above the ground plane;

a feed point centrally disposed between a first end of the first element and a first end of the second element coupled to the first end of the first element and the first end of the second element;

a parasitic element disposed parallel to the dipole having a first end disposed proximate a second distal end of the first element and a second distal end disposed proximate a second distal end of the second element;

a first ground element coupled at a first end to the ground plane disposed proximate the second distal end of the first element and proximate the first end of the parasitic element;

a second ground element coupled at a first end to the ground plane disposed proximate the second distal end of the second element and proximate the second end of the parasitic element.

7. The magnetic dipole according to claim 6, wherein the first element and second element of the dipole are aligned along an axis parallel to the ground plane; and the first element and second element have a width of their metallization greater than a thickness of the metallization; and the first element and second element are orientated such that either their width is along an axis orthogonal to the ground plane or along an axis parallel to the ground plane.

8. The magnetic dipole according to claim 6, wherein the second distal end of the first element is separated from the first ground element by a first gap;

the first end of the parasitic element is separated from the first ground element by a second gap;

the second distal end of the second element is separated from the second ground element by a third gap;

the second end of the parasitic element is separated from the second ground element by a fourth gap; and the parasitic element extends along the length of dipole from the second distal end of the first element to the second distal end of the second element.

9. The antenna according to claim 6, wherein the parasitic element is disposed closer to the ground plane than the first element and second element of the dipole.

10. The antenna according to claim 6, wherein either:

a portion of the first ground element is disposed between the second distal end of the first element and the first end of the parasitic element; and a portion of the second ground element is disposed between the second distal end of the second element and the second end of the parasitic element;

or:

the first end of the parasitic element is disposed between the second distal end of the first element and a portion of the first ground element; and the second end of the parasitic element is disposed between the second distal end of the second element and a portion of the second ground element.

11. An electric dipole responsive to a linear electric field comprising:

a ground plane;

a dipole comprising a first element and a second element disposed above the ground plane;

a feed point centrally disposed between a first end of the first element and a first end of the second element coupled to the first end of the first element and the first end of the second element;

a parasitic element disposed parallel to the dipole having a first end disposed proximate a second distal end of the first element and a second distal end disposed proximate a second distal end of the second element;

a first ground element coupled at a first end to the ground plane disposed proximate the second distal end of the first element and proximate the first end of the parasitic element;

a second ground element coupled at a first end to the ground plane disposed proximate the second distal end of the second element and proximate the second end of the parasitic element.

12. The electric dipole according to claim 11, wherein the first element and second element of the dipole are aligned along an axis parallel to the ground plane; and the first element and second element have a width of their metallization greater than a thickness of the metallization; and the first element and second element are orientated such that either their width is along an axis orthogonal to the ground plane or along an axis parallel to the ground plane.

13. The electric dipole according to claim 11, wherein the second distal end of the first element is separated from the first ground element by a first gap;

the first end of the parasitic element is separated from the first ground element by a second gap;

the second distal end of the second element is separated from the second ground element by a third gap;

the second end of the parasitic element is separated from the second ground element by a fourth gap; and the parasitic element extends along the length of dipole from the second distal end of the first element to the second distal end of the second element.

14. The antenna according to claim 11, wherein the parasitic element is disposed closer to the ground plane than the first element and second element of the dipole.

15. The antenna according to claim 11, wherein either:

a portion of the first ground element is disposed between the second distal end of the first element and the first end of the parasitic element; and a portion of the second ground element is disposed between the second distal end of the second element and the second end of the parasitic element;

or:

the first end of the parasitic element is disposed between the second distal end of the first element and a portion of the first ground element; and the second end of the parasitic element is disposed between the second distal end of the second element and a portion of the second ground element.

16. An antenna responsive to circularly polarized signals comprising:

a ground plane;

a first antenna element disposed upon a first side of the ground plane; and a second antenna element disposed upon the first side of the ground plane orthogonal to the first antenna element; wherein the antenna is responsive at any positive elevation above the first side of the ground plane; and each of the first antenna element and the second antenna element comprise:

a dipole comprising a first element and a second element disposed above the ground plane;

a feed point centrally disposed between a first end of the first element and a first end of the second element coupled to the first end of the first element and the first end of the second element;

a parasitic element disposed parallel to the dipole having a first end disposed proximate a second distal end of the first element and a second distal end disposed proximate a second distal end of the second element;

a first ground element coupled at a first end to the ground plane disposed proximate the second distal end of the first element and proximate the first end of the parasitic element;

a second ground element coupled at a first end to the ground plane disposed proximate the second distal end of the second element and proximate the second end of the parasitic element.

17. The antenna according to claim 16, wherein the first element and second element of the dipole are aligned along an axis parallel to the ground plane; and the first element and second element have a width of their metallization greater than a thickness of the metallization; and the first element and second element are orientated such that either their width is along an axis orthogonal to the ground plane or along an axis parallel to the ground plane.

18. The antenna according to claim 16, wherein the second distal end of the first element is separated from the first ground element by a first gap;

the first end of the parasitic element is separated from the first ground element by a second gap;

the second distal end of the second element is separated from the second ground element by a third gap;

the second end of the parasitic element is separated from the second ground element by a fourth gap; and the parasitic element extends along the length of dipole from the second distal end of the first element to the second distal end of the second element.

19. The antenna according to claim 16, wherein the parasitic element is disposed closer to the ground plane than the first element and second element of the dipole.

20. The antenna according to claim 16, wherein either:

a portion of the first ground element is disposed between the second distal end of the first element and the first end of the parasitic element; and a portion of the second ground element is disposed between the second distal end of the second element and the second end of the parasitic element;

or:

the first end of the parasitic element is disposed between the second distal end of the first element and a portion of the first ground element; and the second end of the parasitic element is disposed between the second distal end of the second element and a portion of the second ground element.

21. An antenna comprising:

a ground plane;

a dipole comprising a first element and a second element disposed above the ground plane;

a feed point centrally disposed between a first end of the first element and a first end of the second element coupled to the first end of the first element and the first end of the second element;

an annular parasitic element disposed parallel to the dipole having a first end disposed proximate a second distal end of the first element and a second distal end disposed proximate a second distal end of the second element where the annular parasitic element is electrically coupled to the dipole, a first ground element and a second ground element;

the first ground element being coupled at a first end to the ground plane disposed proximate the second distal end of the first element and proximate an outer periphery of the annular parasitic element;

the second ground element being coupled at a first end to the ground plane disposed proximate the second distal end of the second element and proximate the outer periphery of the annular parasitic element wherein a center of the annular parasitic element is aligned with a center of the dipole.

22. The antenna according to claim 21, wherein the outer periphery of the annular parasitic element is disposed above the dipole and extends below a portion of the first ground element; and the outer periphery of the annular parasitic element is disposed above the dipole and extends below a portion of the second ground element.

23. The antenna according to claim 21, wherein the first ground element extends towards the center of the antenna to a first distance from the center of the dipole;

the second ground element extends towards the center of the antenna to the same first distance from the center of the dipole; and the annular parasitic element comprises:

an annular ring having an outer radius less than the first distance;

a first tab extending outward from an outer periphery of the annular ring by a second distance such that the first tab extends out beyond the first distance and is disposed above the dipole and under a portion of the first ground element; and a second tab extending outward from the outer periphery of the annular ring by the second distance such that the second tab extends out beyond the first distance and is disposed above the dipole and under a portion of the first ground element.

24. The antenna according to claim 21, wherein the first element and second element of the dipole are aligned along an axis parallel to the ground plane; and the first element and second element have a width of their metallization greater than a thickness of the metallization; and the first element and second element are orientated such that either their width is along an axis orthogonal to the ground plane or along an axis parallel to the ground plane.

25. The antenna according to claim 21, wherein the annular parasitic element is disposed closer to the ground plane than the first element and second element of the dipole.

26. An antenna comprising:

a ground plane;

a dipole comprising a first element and a second element each disposed parallel to the ground plane;

a feed point centrally disposed between a first end of the first element and a first end of the second element coupled to the first end of the first element and the first end of the second element;

a first ground element coupled at a first end to the ground plane disposed proximate the second distal end of the first element and having a portion extending vertically from the ground plane to a defined height above the ground plane directly connected to another portion extending over the first element for a defined distance from the second distal end of the first element with a constant separation from the first element; and a second ground element coupled at a first end to the ground plane disposed proximate the second distal end of the second element and having a portion extending vertically from the ground plane to a defined height above the ground plane directly connected to another portion extending over the second element for a defined distance from the second distal end of the second element with a constant separation from the second element; wherein the first element is absent any portion of the first ground element over the any remaining portion of the first element from the defined distance from the second distal end of the first element;

the second element is absent any portion of the second ground element over the any remaining portion of the second element from the defined distance from the second distal end of the second element; and neither the first element nor second element are electrically coupled to a parasitic element disposed along a portion of the dipole.

27. An antenna to receive or generate circularly polarized signals comprising:

a ground plane;

a first antenna element disposed upon a first side of the ground plane; and a second antenna element disposed upon the first side of the ground plane orthogonal to the first antenna element; wherein the antenna is responsive at any positive elevation above the first side of the ground plane; and each of the first antenna element and the second antenna element comprise:

a ground plane;

a dipole comprising a first element and a second element each disposed parallel to the ground plane;

a feed point centrally disposed between a first end of the first element and a first end of the second element coupled to the first end of the first element and the first end of the second element;

a first ground element coupled at a first end to the ground plane disposed proximate the second distal end of the first element and having a portion extending vertically from the ground plane to a defined height above the ground plane directly connected to another portion extending over the first element for a defined distance from the second distal end of the first element with a constant separation from the first element; and a second ground element coupled at a first end to the ground plane disposed proximate the second distal end of the second element and having a portion extending vertically from the ground plane to a defined height above the ground plane directly connected to another portion extending over the second element for a defined distance from the second distal end of the second element with a constant separation from the second element;

the first element is absent any portion of the first ground element over the any remaining portion of the first element from the defined distance from the second distal end of the first element;

the second element is absent any portion of the second ground element over the any remaining portion of the second element from the defined distance from the second distal end of the second element; and neither the first element nor second element are electrically coupled to a parasitic element disposed along a portion of the dipole.

* * * * *